United States Patent
Zave et al.

(10) Patent No.: US 9,927,784 B2
(45) Date of Patent: Mar. 27, 2018

(54) UBIQUITOUS COMPUTING METHODS AND APPARATUS

(71) Applicant: AT&T Intellectual Property I, L.P., Atlanta, GA (US)

(72) Inventors: Pamela Zave, Chatham, NJ (US); Eric Cheung, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 538 days.

(21) Appl. No.: 14/560,861

(22) Filed: Dec. 4, 2014

(65) Prior Publication Data

US 2016/0161927 A1 Jun. 9, 2016

(51) Int. Cl.
*G06F 19/00* (2011.01)
*G05B 15/02* (2006.01)

(52) U.S. Cl.
CPC ...... *G05B 15/02* (2013.01); *G05B 2219/2642* (2013.01)

(58) Field of Classification Search
CPC .................. G05B 15/02; G05B 2219/2642
See application file for complete search history.

(56) References Cited

U.S. PATENT DOCUMENTS

| | | | |
|---|---|---|---|
| 6,904,391 B2 | 6/2005 | Merkin et al. | |
| 6,985,809 B2 | 1/2006 | Yasui | |
| 7,613,901 B2 | 11/2009 | Alfano et al. | |
| 7,616,642 B2 | 11/2009 | Anke et al. | |
| 8,307,342 B2 | 11/2012 | Oglesby et al. | |
| 8,373,576 B2 | 2/2013 | Strohm | |
| 8,527,668 B2 | 9/2013 | Dibartolomeo et al. | |

(Continued)

FOREIGN PATENT DOCUMENTS

| | | |
|---|---|---|
| CN | 102201958 | 12/2013 |
| FR | 2983670 | 6/2013 |

(Continued)

OTHER PUBLICATIONS

Towle et al., "Fusing Multiple Sensors Through Behaviors With the Distributed Architecture," 2010, 6 pages.

(Continued)

*Primary Examiner* — Michael D Masinick
(74) *Attorney, Agent, or Firm* — Hanley, Flight & Zimmerman, LLC

(57) ABSTRACT

Ubiquitous computing methods and apparatus are disclosed. An example method includes determining a first setting to control an actuator; setting a first record in a record list, the first record including the first setting, a first immediacy of the first setting, and a first priority of the first setting; determining a second setting; setting a second record in the record list, the second record including the second setting, a second immediacy of the second setting, and a second priority of the second setting, the second priority being lower than the first priority; selecting the first record from the record list based on the first priority being higher than the second priority; deleting the second record from the record list based on the second immediacy; and outputting the first setting to control the actuator when a current setting of the actuator is different than the first setting.

17 Claims, 10 Drawing Sheets

(56) References Cited

U.S. PATENT DOCUMENTS

| | | | | |
|---|---|---|---|---|
| 2006/0161922 | A1* | 7/2006 | Amano | G06F 9/4881 |
| | | | | 718/103 |
| 2010/0073363 | A1* | 3/2010 | Densham | G05B 17/02 |
| | | | | 345/419 |
| 2012/0197852 | A1 | 8/2012 | Dutta et al. | |
| 2012/0197898 | A1 | 8/2012 | Pandey et al. | |
| 2012/0197911 | A1 | 8/2012 | Banka et al. | |
| 2012/0296963 | A1 | 11/2012 | Lu et al. | |
| 2013/0289924 | A1 | 10/2013 | Jiang | |
| 2013/0290305 | A1 | 10/2013 | Feng et al. | |
| 2014/0183957 | A1 | 7/2014 | Duchesneau | |
| 2014/0222813 | A1 | 8/2014 | Yang et al. | |
| 2015/0081873 | A1* | 3/2015 | Stein | G06Q 10/067 |
| | | | | 709/223 |
| 2015/0277981 | A1* | 10/2015 | Nalluri | G06T 1/20 |
| | | | | 718/103 |
| 2016/0161927 | A1* | 6/2016 | Zave | G05B 15/02 |
| | | | | 700/275 |

FOREIGN PATENT DOCUMENTS

| | | |
|---|---|---|
| JP | 4944160 | 5/2012 |
| WO | 2013014222 | 1/2013 |
| WO | 2013097546 | 7/2013 |
| WO | 2014049603 | 4/2014 |
| WO | 2014115870 | 7/2014 |

OTHER PUBLICATIONS

Aberer et al., "Middleware support for the 'Internet of Things,'" 2006, 5 pages.
Vermesan et al., "Internet of Things Strategic Research Roadmap," 2011, 44 pages.
Guinard et al., "Interacting with the SOA-based Internet of Things: Discovery, Query, Selection, and On-Demand Provisioning of Web Services," Feb. 18, 2010, 16 pages.
Guinard et al., "5 From the Internet of Things to the Web of Things: Resource Oriented Architecture and Best Practices," 2011, 33 pages.
Bannach et al., "Rapid Prototyping of Activity Recognition Applications," Jan. 13, 2008, 19 pages.
Zave et al., "A Modular Programming Abstraction for Ubiquitous Computing," 2014, 11 pages.
Arasu et al., "The CQL Continuous Query Language: Semantic Foundations and Query Execution," Jun. 2006, 32 pages, International Journal on Very Large Data Bases, 15(2):121-142.
Atzori et al., "The Internet of Things: A survey," 2010, 19 pages, Computer Networks, 54(15): 2787-2805.
Brush et al., "HomeLab: Shared Infrastructure for Home Technology Field Studies," Sep. 2012, 6 pages, Proceedings of the Workshop on Systems and Infrastructure for the Digital Home, ACM.
Brush et al., "Home Automation in the Wild: Challenges and Opportunities," May 2011, 10 pages, Proceedings of the ACM Conference on Computer-Human Interaction, ACM.
Caceres et al., "Ubicomp Systems at 20: Progress, Opportunities, and Challenges," Dec. 20, 2011, 7 pages, IEEE Pervasive Computing, 11(1): 14-21.
"CLIPS: A Tool for Building Expert Systems," updated Mar. 25, 2015, 1 page, http://clipsrules.sourceforge.net.
Davidoff et al., "Principles of Smart Home Control," 2006, 16 pages, Proceedings of UbiComp. ACM.
D'Ippolito et al., "Synthesising Non-Anomalous Event-Based Controllers for Liveness Goals," Feb. 2013, 36 pages, ACM Transactions on Software Engineering and Methodology, 22(1), Article 9.
Dixon et al., "An Operating System for the Home," 2012, 16 pages, Proceedings of the 9th USENIX/ACM Symposium on Networked Systems Design and Implementation.
"Drools: the business logic integration platform," retrieved from the internet Apr. 15, 2015, 2 pages, http://www.jboss.org/drools.
Edwards et al., "At Home with Ubiquitous Computing: Seven Challenges," 2001, 17 pages, Ubicomp 2001, LNCS 2201, pp. 256-272, 2001, Springer-Verlag Berlin Heidelberg.
Edwards et al., "Advancing the State of Home Networking," Jun. 2011, 10 pages, Communications of the ACM, vol. 54, No. 6.
Feki et al., "The Internet of Things: The Next Technological Revolution," 2013, 2 pages, IEEE Computer Society.
Leelaprute et al., "Detecting Feature Interactions in Home Appliance Networks," 2008, 9 pages, Proceedings of the 9th ACIS International Conference on Software Engineering, Artificial Intelligence, Networking, and Parallel/Distributed Computing, pp. 895-903, IEEE.
Lesser et al., "A Multi-Agent System for Intelligent Environment Control," Oct. 25, 1998, 14 pages, Proceedings of the 3rd International Conference on, Autonomous Agents, pp. 291-298, ACM Press.
Paluska et al., "Structured Decomposition of Adaptive Applications," 2008, 10 pages, Pervasive and Mobile Computing, 4(6): 791-806.
Pfisterer et al., "SPITFIRE: Towards a Semantic Web of Things," 2011, 12 pages, IEEE Communications Magazine.
Roman et al., "A Middleware Infrastructure for Active Spaces," 2002, 10 pages, PERVASIVE computing.
Sousa et al., "Aura: An Architectural Framework for User Mobility in Ubiquitous Computing Environments," 2002, 14 pages, Proceedings of the 3rd Working IEEE/IFIP Conference on Software Architecture, Kluwer Academic Publishers, pp. 29-43.
Takayama et al., "Making Technology Homey: Finding Sources of Satisfaction and Meaning in Home Automation," 2012, 10 pages, UbiComp '12, Pittsburgh, USA.
Wilson et al., "Considering Side Effects in Service Interactions in Home Automation—an Online Approach," 2008, 16 pages, Feature Interactions in Telecommunications and Software Systems IX, pp. 172-187, IOS Press.
Woodruff et al., "Sabbath Day Home Automation: 'It's Like Mixing Technology and Religion,'" 2007, 10 pages, CHI 2007, San Jose, California, USA.
Zave et al., "Four Dark Corners of Requirements Engineering," Jan. 1997, 30 pages, ACM Transactions on Software Engineering and Methodology, 6(1): 1-30.
Kolberg et al., "Feature Interactions in Services for Internet Personal Appliances," 2001, 6 pages, Telecordia Technologies, Inc.
Soares et al., "Graph-based Approach for Interference Free Integration of Pervasive Applications," Jul. 3-5, 2012, 6 pages, Wireless and Pervasive Computing (ISWPC), 2012 7th International Symposium.
Schreiber et al., "PerLa: a Language and Middleware Architecture for Data Management and Integration in Pervasive Information Systems," Mar. 10, 2011, 21 pages, IEEE Transactions on Software Engineering, vol. 38 No. 2, Year 2012.

* cited by examiner

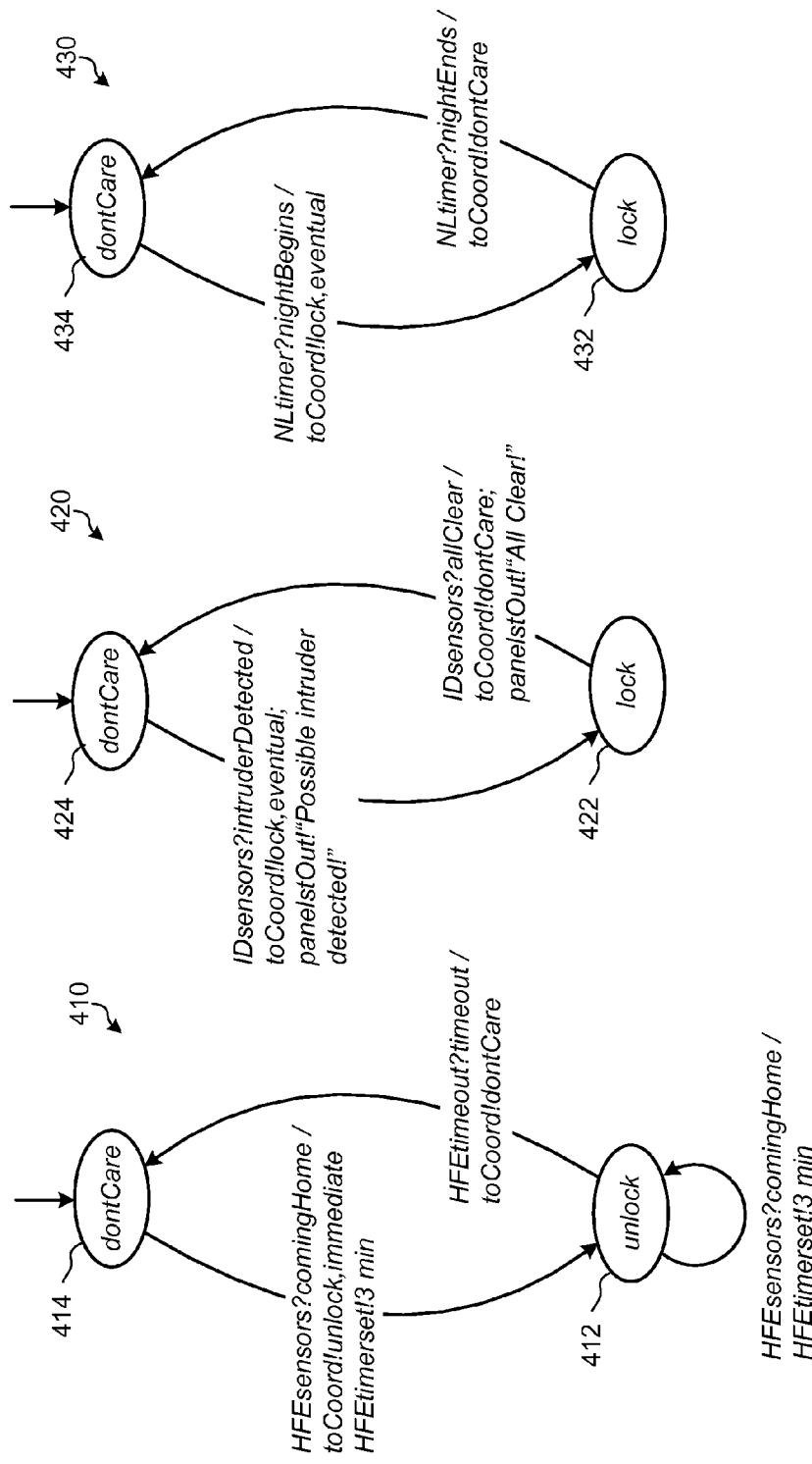

UBIQUITOUS COMPUTING METHODS AND APPARATUS

FIELD OF THE DISCLOSURE

This disclosure relates generally to automated device control and, more particularly, to ubiquitous computing methods and apparatus.

BACKGROUND

Ubiquitous computing, or the "Internet of Things," offers the opportunity to control networked devices that interact with people and affect the environments in which people live. User studies show that one of the major challenges of ubiquitous computing is designing complex technology that users can understand and interact with successfully, and with which users can feel comfortable.

BRIEF DESCRIPTION OF THE DRAWINGS

FIGS. 4A, 4B, 4C, and 4D are example state diagrams that may be used to implement actuator output determiners for respective feature controllers that control different features of an example door lock ubiquitous computing device of FIG. 1.

The figures are not to scale. Wherever appropriate, the same reference numbers will be used throughout the drawing(s) and accompanying written description to refer to the same or like parts.

DETAILED DESCRIPTION

Figure 1:
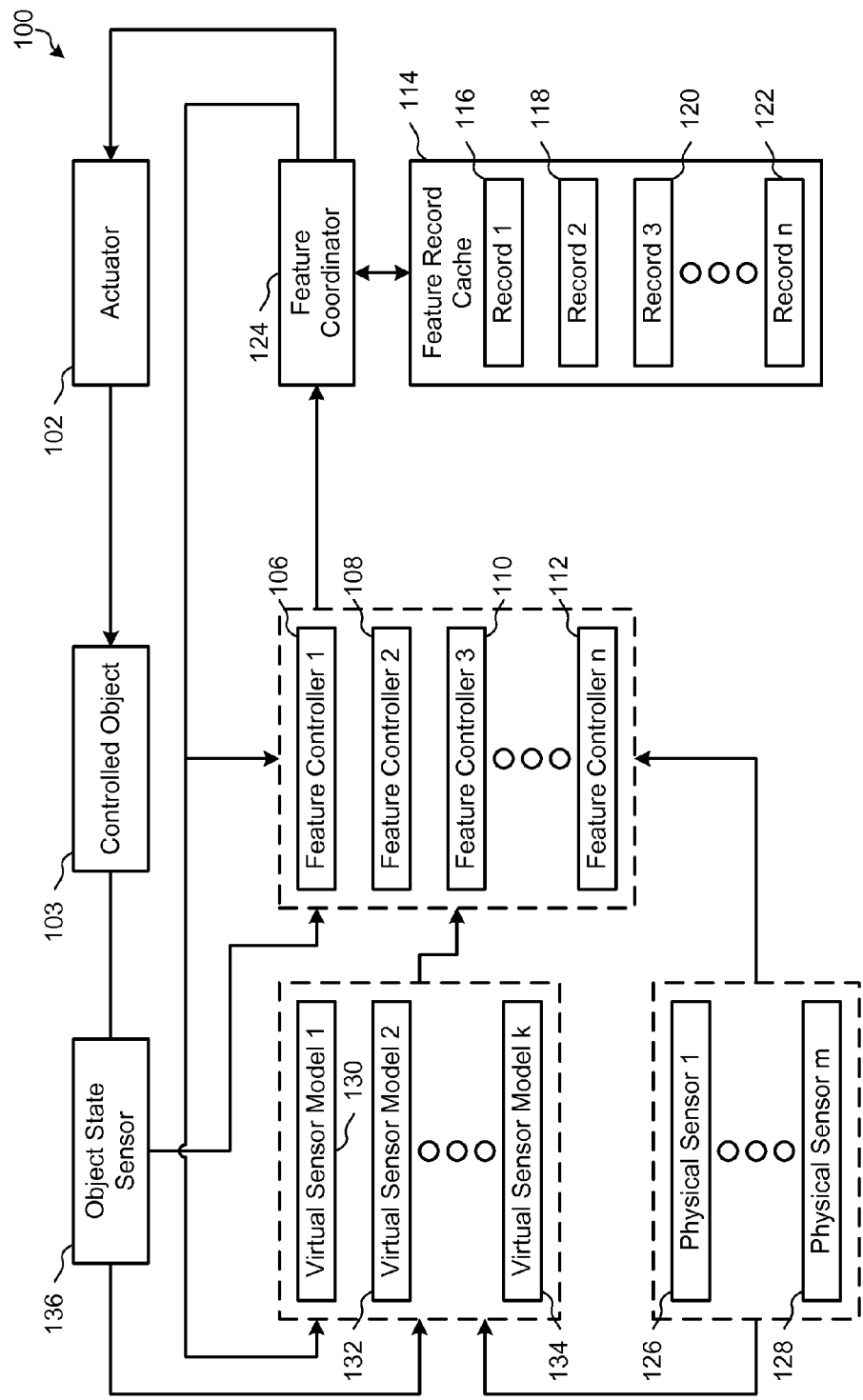
FIG. 1 is a block diagram of an example ubiquitous computing device to control an actuator in accordance with the teachings of this disclosure.

Examples disclosed herein specify and implement control programs for ubiquitous computing devices in the form of features. In some examples, individual features of a device are independent of one another. That is, each feature satisfies a particular goal or requirement of the ubiquitous computing device. In some examples, multiple features run in parallel and the outputs of the features are selected to control the ubiquitous computing device according to the relative priorities of the features. Examples disclosed herein enhance the efficiency and effectiveness of ubiquitous computing devices by balancing between manual and automated control, while simplifying feature specification and feature implementation. For example, by adhering to a set of feature coordination rules, examples disclosed herein enable the rapid development and/or addition of features to ubiquitous computing devices and may be applied to many different control applications with little to no customization of feature coordination required.

Known devices have required intense customization of feature coordination to operate, and modifying the functionality of such devices requires ensuring that changes do not affect prior functionality. Such efforts are resource-intensive. In contrast, examples disclosed herein enable development of features independently of prior functionality, reducing the resources needed to improve ubiquitous computing devices after release (e.g., after installation in a consumer system).

As used herein, the term "ubiquitous computing device" refers to a device that processes inputs according to one or more specific behavioral requirements of the device to achieve a tangible result. Ubiquitous computing devices, as used herein, are often synonymous with the concept of the "Internet of Things" in which previously-dumb (i.e., non-computerized) devices are provided with processing capabilities and specialized intelligence to assist a user in the operation of the device.

As used herein, the term "feature" refers to the specification and/or implementation of an independent requirement of the behavior of a ubiquitous computing device. As used herein, the term "feature interaction" refers to a conflict between two or more features.

As used here, "manual" control refers to control in direct response to deliberate user requests or actions. Manual control can include electronic control (e.g., implemented by the control system), such as when a user requests unlocking of a door at a door lock system, enters a pass code, and is authenticated by the door lock system. Manual control of the system can also include mechanical control, such as when a user locks or unlocks the door with a key, thereby bypassing the electrical control by the door lock system. Mechanical control is not implemented by the electronic control, but the action can be detected by the electrical portion of the control system.

Examples disclosed herein provide ubiquitous computing according to a framework that improves the efficiency, reliability, and usability of potentially-complex device behaviors. Because the requirements for control of networked devices can reflect diverse purposes, situations, and/or levels of certainty about a current situation, examples disclosed herein specify and implement requirements independently. In some such examples, the outputs of features implementing such requirements are implemented at run-time according to assigned priorities.

Advantages of examples disclosed herein include simplification of implementing independent requirements in devices, making control of devices more flexible and/or extensible (e.g., because requirements can come from different sources), and/or enabling addition and/or deletion of control requirements at any time. Examples disclosed herein use priority to resolve conflicts among competing goals. As used herein, a feature with higher priority is more important than (e.g., takes precedence over and/or is more preferable for the purposes of controlling behavior than) a feature with lower priority. In some examples, priority is encoded in feature records using integer values.

Some examples disclosed herein handle feedback loops introduced by manual control of a ubiquitous computing device such that automated control of the device reaches quiescence (e.g., reaches a steady-state consistent with the manual control).

FIG. 1 is a block diagram of an example ubiquitous computing device 100 to control an actuator 102. The example actuator 102 may be, but is not necessarily, a part of the ubiquitous computing device 100. The example actuator 102 of FIG. 1 can be any type of actuator, such as an electronic actuator. An example of an actuator 102 described below is an electronic door lock for a home. On the example electronic door lock, there are two access panels mounted by the door: one outside the house and one inside the house. Each example panel has buttons to request that the door be locked or unlocked, a keypad for entering passcodes, and a message display.

The example actuator 102 controls a controlled object 103. In the example of a door lock, the controlled object 103 may be the locking mechanism, and the actuator 102 electronically manipulates the locking mechanism (e.g., via electromagnetic force, etc.).

The example ubiquitous computing device 100 of FIG. 1 includes a set of feature controllers 106, 108, 110, 112. Each of the example feature controllers 106-112 receives one or more input signals and generates a record to indicate a desired control action to be performed by the actuator 102 to control the controlled object 103. While four feature controllers 106-112 are shown in FIG. 1, the ubiquitous computing device 100 may have any number of feature controllers 106-112 to implement behavioral requirements of the device.

The feature controllers 106-112 of FIG. 1 are assigned respective priority values. For example, the feature controller 106 may be assigned priority 10, the feature controller 108 may be assigned priority 3, the feature controller 110 may be assigned priority 2, and the feature controller 112 may be assigned priority 1. In some examples, one or more of the feature controllers 106-112 may have the same priority value. As discussed in more detail below, each of the example feature controllers 106-112 is provided with a control scheme (e.g., a control algorithm, a control program, etc.) that causes the feature controllers 106-112 to generate output commands based on respective inputs. An example implementation of one of the feature controllers 106-112 is described below with reference to FIG. 3.

In some other examples, one or more of the feature controllers 106-112 implement multiple features. For example, a feature controller 106-112 may be required to implement multiple different behavioral requirements of the ubiquitous computing device 100. In some such examples, one or more of the different behavioral requirements have different priority constraints, and the constraints may conflict in such a way that the feature cannot fit anywhere in the priority order. To implement multiple features using one feature controller 106-112, the feature controller 106-112 implements the different requirements as sub-features with different priority values under one feature type. Each feature and/or sub-feature is uniquely identified by a feature, priority pair.

Using the example of the electronic door lock, the feature controllers 106-112 implement the following behavior requirements as independent features:

Electronic Operation (EO): When a person requests a lock or unlock operation from an access panel, if that operation from that panel requires a passcode, read the passcode and check the entered passcode. If the operation is refused, send a message to the access panel. Otherwise, lock or unlock the door as requested. In the example below, the feature controller 106 implements the EO feature.

Hands-Free Entry (HFE): When sensors detect that a resident's car is arriving on the property, unlock the door so that the resident can enter easily (e.g., even when the resident is carrying packages). In the example below, the feature controller 108 implements the HFE feature.

Intruder Defense (ID): When sensors outside the house detect the possible presence of an intruder, lock the door and send "possible intruder detected" messages to the access panels. Keep the door locked until the sensors provide an "all clear" signal, at which time "all clear" messages are sent to the access panels. In the example below, the feature controller 110 implements the ID feature.

Night Lock (NL): In "night mode," automatically lock the door after it has been unlocked for a defined period of time. Residents may set the time when "night mode" begins and ends. In the example below, the feature controller 112 implements the NL feature.

The example feature controllers 106-112 implement the respective ones of EO, HFE, ID, and NL. Door lock control may be complicated when the electronic door lock is battery-powered. Electronic control of the lock can fail (e.g., when the battery dies). To handle such situations, the example door lock permits mechanical or manual operation (e.g., using a physical key as a credential).

The example feature controllers 106-112 of FIG. 1 run concurrently. The outputs of the feature controllers 106-112 may be considered virtual actuator settings, because each feature controller 106-112 functions as if that feature controller 106-112 is controlling the object unilaterally via a dedicated actuator.

The example features controllers 106-112 populate a feature record cache 114 (e.g., a record list) with respective records 116, 118, 120, 122 representing the virtual actuator settings. For example, the feature controller 106 generates a record 116 and provides the record to a feature coordinator 124, which manages the feature record cache 114 as described in more detail below. In addition to virtual actuator settings, the records include other information, such as priority, to enable generation of a control signal (e.g., an actuator setting) to the actuator 102.

Each of the example feature records 116-122 in the feature record cache 114 of FIG. 1 contains five items: a timestamp time; an actuator setting of setting; a mode setting mode; a feature having a data type of Feature; and a priority having a data type of Integer. Each feature record 116-122 generated and provided to the feature coordinator (except for records with a dontCare setting, which have no mode). These data items are discussed in more detail below.

The example feature coordinator 124 of FIG. 1 selects between the records 116-122 in the feature record cache 114 to determine how to control the actuator 102. An example implementation of the feature coordinator 124 is described below with reference to FIG. 2.

To determine a desired output of the actuator 102 that corresponds to a particular behavioral requirement, the example feature controllers 106-112 receive input signals from one or more physical sensors 126, 128, one or more virtual sensors 130, 132, 134, and/or one or more object state sensors 136.

The physical sensors 126, 128 may include any sensor that measures or detects physical quantities (e.g., temperature, pressure, motion, presence of chemicals, chemical composition, sound, magnetism, light, and/or any other kind of sensor). The type(s) of physical sensors 126, 128 are determined based on the type or purpose of the ubiquitous computing device 100. In some examples, one or more of the physical sensors 126, 128 is physically separate and/or remote from the ubiquitous computing device 100. In some such examples, the separated physical sensor 126, 128 communicates its output to the ubiquitous computing device 100 via a communication network (e.g., a wireless network, a wired connection, etc.).

The example virtual sensors 130-134 of FIG. 1 receive signals from one or more of the example physical sensors 126, 128 and/or the state of the actuator 102 from the object state sensor(s) 136. The example virtual sensors 130-134 are models that generate virtual sensor values that represent the output of virtual sensors (e.g., soft sensors, proxy sensors, inferential sensors, etc.), and make inferences of the state of a quantity based on input signals.

The example object state sensor 136 of FIG. 1 is a physical sensor (e.g., another one of the physical sensors 126, 128) that senses the current state of the controlled object 103 (e.g., open/closed, position, etc.). For example, the state of the controlled object 103 (e.g., locked or unlocked, in the door lock example) may not be the most recent state set by the feature coordinator 124 due to mechanical or manual operation of the actuator 102 and/or the controlled object 103. In the door lock example, a physical sensor (e.g., a Hall effect sensor or other type of sensor) may be used to determine whether a locking mechanism is in a locked state or an unlocked state. In some examples, the feature coordinator 124 sends the output actuator setting provided to the actuator 102 to the virtual sensor models 130-134 and/or to the feature controllers 106-112. For example, the actuator setting output by the feature coordinator 124 may be compared with the value output by the object state sensor 136 to detect failure of the actuator 102 and/or to detect changes in the controlled object 103 having external causes.

In the door lock example, the feature controllers 106-112 and the feature coordinator 124 use the actuator settings specified in an enumerated set {lock, unlock}. The door lock (e.g., the controlled object 103) has a single sensor (e.g., the object state sensor 136), which draws its sensor output values from an enumerated set {locked, unlocked} or an equivalent set (e.g., {0, 1}). In this example, the object state sensor 136 outputs a value only when the state of the door lock (e.g., the actuator 102) changes. However, the example object state sensor 136 may additionally or alternatively make periodic readings of the lock state and output the resulting value locked or unlocked.

The example ubiquitous computing device 100 of FIG. 1 operates according to the following five rules. The example rules below may be used to implement the feature controllers and/or feature coordinator for a ubiquitous computing device having any combination of features and/or actuators.

Rule 1: All actuator settings by the feature controllers 106-112 (e.g., virtual actuator settings) are persistent. For example, a feature controller 106 does not emit a setting unlock to as a single instance command to "unlock the door now." Instead, the example feature controller 106 emits a setting unlock to mean "unlock the door now and keep it unlocked until I emit a different setting" (keeping in mind that the feature controller 106 is independent and behaves as if it has sole control over the actuator 102). The example ubiquitous computing device 100 complies with Rule 1 because, in the door lock example, if settings were interpreted as instantaneous events, then immediately after the feature controller 106 above unlocks the door, a lower-priority feature (e.g., feature controller 108) could lock it again, which could defeat the purpose of using different priorities for the feature controllers 106-112.

As a result of Rule 1 (i.e., persistence of actuator settings), when a feature controller 106 outputs a setting, the output setting becomes the current setting of the feature controller 106. The current setting of the feature controller 106 persists until the current setting is replaced by another (e.g., more recent) setting of that feature controller 106. In some examples, the current setting has a fixed duration and is replaced when that duration expires. In some other examples, current settings persist until a new sensor value is received at the feature controller 106.

Rule 2: The type(s) of the virtual actuator settings by the feature controllers 106-112 must be the same types as the corresponding real settings, plus a reserved value dontCare. The dontCare value means that the feature controller 106-112 is not attempting to exert control over the actuator setting. Rule 2 occurs due to the use of persistent actuator settings under Rule 1. Because all virtual actuator settings are persistent, if the highest priority feature controller (e.g., the feature controller 106) were always to emit settings that exert control over the actuator 102, then none of the other feature controllers 108-112 would ever be able to exert control or take effect. The dontCare setting, when output by a feature controller 106, create windows of opportunity during which lower-priority feature controllers 108-112 can exert control over the actuator 102.

Replacing a real (e.g., enumerated, or non-dontCare) virtual actuator setting with a dontCare may be referred to as "canceling" the virtual actuator setting. In the example of FIG. 1, the feature coordinator 124 does not set records containing explicit dontCare settings feature record cache 114. Instead, to cancel a virtual actuator setting, the example feature coordinator 124 deletes the corresponding feature record 116 from the feature record cache 114 upon receiving a feature record 116 from the feature controller 106 having the same feature and priority and a dontCare virtual actuator setting. Thus, while the example feature controller 106 maintains a dontCare setting, the feature record cache 114 is devoid of a feature record 116 corresponding to that feature controller 106. As used herein, deleting a feature record refers to removing the record from the feature record cache 114, marking the feature record as irrelevant and/or unusable, and/or otherwise ignoring or not using the feature record.

Rule 3: If multiple feature controllers 106-112 have the same priority value, then the most recent virtual actuator setting by those feature controllers 106-112 having the same priority value takes precedence. Because two or more of the feature controllers 106-112 may have multiple current settings that may conflict at a given time, Rule 3 provides a way to choose which of those feature controllers 106-112 takes precedence. Rule 3 is consistent with the fact that the most recent virtual actuator setting by any individual feature controller 106-112 takes precedence over earlier settings by that feature controller 106-112.

Rule 4: If all virtual actuator settings by the feature controllers 106-112 become dontCare, the actuator setting output by the feature coordinator 124 to the actuator 102 is left unchanged. Persistent settings according to Rule 1 may be uncomfortable for users who do not have definite ideas about how long a setting should last. For example, when a person uses the Electronic Operation of the door lock example to unlock his front door in the morning, his intention may be to leave it open all day for residents and visitors to go in and out. In such a case, an unlock duration such as one minute is far too short. On the other hand, if the unlock setting lasts until the next manual lock operation then, because manual operations are given the highest priority in this example, the door will remain unlocked even when Intruder Defense has detected an intruder and is attempting to lock it. Rule 4 provides an indefinite duration, which keeps the door unlocked until something happens to make locking desirable.

Under Rule 4, the duration of the manual unlock setting may be short (e.g., one minute, two minutes, etc). When the minute expires, the feature controller 106 implementing Electronic Operation deletes the feature record 116 and has a dontCare virtual actuator setting. However, if all of the other feature controllers 108-112 also have dontCare settings in force (e.g., the feature record cache 114 is empty), then the actuator 102 will retain an unlock setting under Rule 4. The actuator 102 will lock only when one of the feature controllers 106-112 outputs a new virtual actuator setting lock, which is then implemented by the feature coordinator 124.

Rule 5: Each virtual actuator setting in the enumerated set (e.g., {lock, unlock}), but not the dontCare setting, has a mode setting (e.g., an immediacy) that is either immediate or eventual. In the example of FIG. 1, the feature records 116-122 specify the mode setting in association with the virtual actuator output setting specified in the feature record 116-122. If the mode setting is eventual, the corresponding virtual actuator setting is intended to take effect as soon as possible and whenever possible (e.g., subject to priority rules). If the mode setting is immediate, the corresponding virtual actuator setting is intended to take effect immediately. However, when the mode setting is immediate but the virtual actuator setting (e.g., an unlock setting in the feature record 122) cannot take effect immediately (e.g., due to priority rules), or if the virtual actuator setting takes effect but is preempted by a different virtual actuator setting from a different feature record (e.g., feature records 116-120) before the feature record 122 is canceled by the corresponding feature controller 112, then the feature record 122 having the immediate mode setting is canceled by the feature coordinator 124.

Rule 5 makes the behavior of the example ubiquitous computing device 100 predictable to users. For example, if a user requests a manual operation, it is acceptable for the ubiquitous computing device 100 to refuse the request (e.g., due to programmed behaviors of the ubiquitous computing device 100). However, it may be unacceptable for the ubiquitous computing device 100 to ignore the request, after which the user may walk away, and then grant the request at a later time when the user may not be aware of the grant by the ubiquitous computing device 100. Such behavior results in a lack of trust in the ubiquitous computing device 100 by the user and undermines the perceived utility of the ubiquitous computing device 100.

In an example of operation of the door lock under Rules 1-5 having the example feature controllers 106-112 and the feature coordinator 124, a resident of a household in which the door lock is installed drives home and is detected by Hands-Free Entry via one or more physical sensors 126, 128 and/or virtual sensors 130-134. The feature controller 110 implementing HFE generates a feature record 120 with an unlock virtual actuator setting. The example feature record 120 for HFE has a duration of 3 minutes, due to uncertainties about how long it will take the resident to get to the door.

Around the same time, motion detectors (e.g., physical sensors 126, 128 and/or virtual sensors 130-134) in the back of the house trigger the feature controller 108 implementing Intruder Defense to generate a feature record 118 having a lock virtual actuator setting. The feature controller 108 (e.g., Intruder Defense) has a higher priority (e.g., 3) than the Hands-Free Operation, so the feature coordinator 124 determines that the actuator setting is to be lock and, therefore, the controlled object 103 remains in a locked state. The user finds that the door is locked and sees an intruder alert on the door panel. When the user goes to the back of the house, he finds that a squirrel has been sensed as an intruder. When the squirrel is removed, the feature controller 108 generates a dontCare virtual actuator setting and, thus, deletes the feature record 118 asserting a lock actuator setting. If the feature record 118 is deleted within the 3 minute duration of the feature record 120, the example feature coordinator 124 determines that the actuator setting should be unlock and outputs an unlock signal to the actuator 102 to cause the actuator 102 to unlock the controlled object 103.

The immediate mode setting may be used to, for example, implement manual operations electronically. If manual operations are not immediately successful the user may then not want or expect them, so they should be canceled. In the above example the hands-free unlock may be in the immediate mode setting because, while hands-free unlock is not a manual operation as defined above because the resident did not explicitly request that the door be unlocked, hands-free unlock is similar to a manual operation in that the hands-free unlock feature is intended for the immediate benefit of a user who will expect it to occur. If hands-free unlock has an immediate mode setting, the feature record 120 is canceled by the feature coordinator 124 when the feature record 120 arrives at the coordinator (if Intruder Defense is already triggered) and/or as soon as the feature controller 108 sets the feature record 118 at the feature record cache 114 (e.g., when the Intruder Defense is triggered).

Additionally or alternatively, the immediate mode setting may be used for mechanical operations of the door lock with a knob and/or key. When a mechanically-operated actuator setting is over-ridden by some other actuator setting, the mechanically-operated actuator setting is canceled and can have no further effect.

Another example of the immediate mode setting includes implementing a feature whose purpose can be achieved in alternative ways (e.g., using alternative actuators). For example, if a first actuator setting of the feature cannot be honored immediately, the example feature may try an alternative actuator or other solution rather than waiting for possible eventual success.

Figure 2:
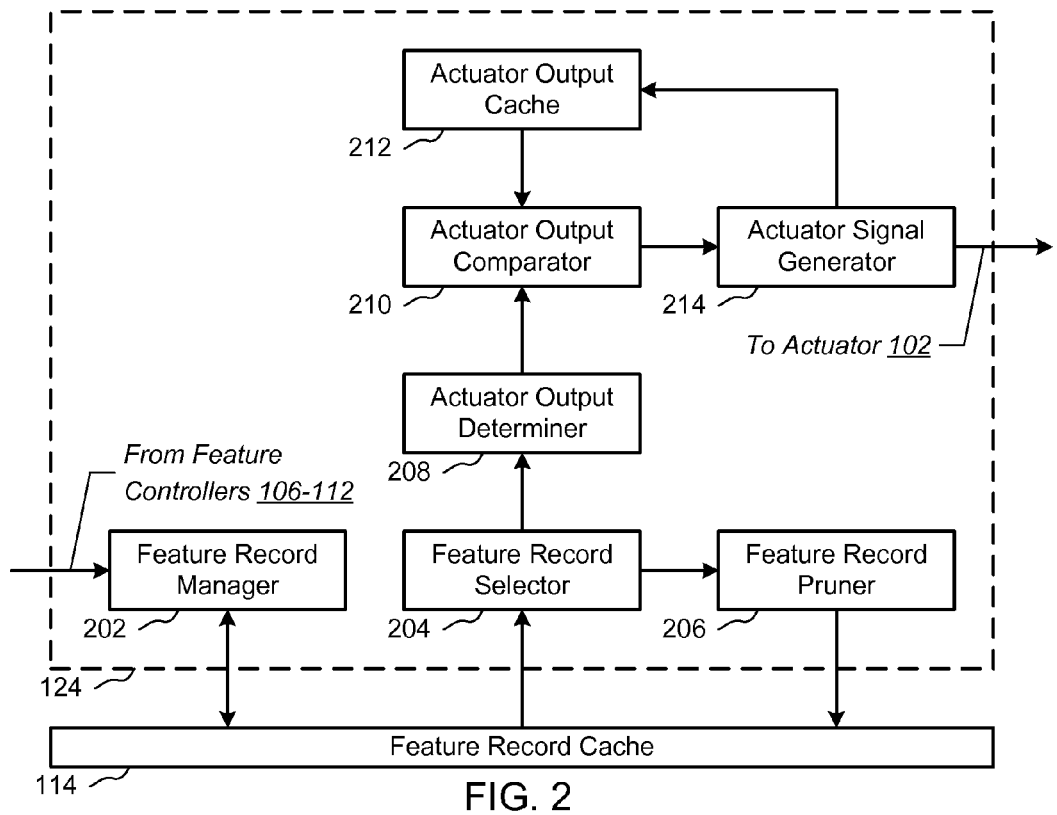
FIG. 2 is a more detailed block diagram of the example feature coordinator of FIG. 1.

FIG. 2 is a more detailed block diagram of the example feature coordinator 124 of FIG. 1. The example feature coordinator 124 of FIG. 2 includes a feature record manager 202, a feature record selector 204, a feature record pruner 206, an actuator output determiner 208, an actuator output comparator 210, an actuator output cache 212, and an actuator signal generator 214.

The example feature record manager 202 of FIG. 2 receives feature records 116-122 from the feature controllers 106-112 of FIG. 1 via a toCoord data stream. The example feature record manager 202 reads the feature records 116-122 as they are received and controls the feature records 116-122 stored in the feature record cache 114 based on the data in the feature records 116-122 (e.g., actuator setting, mode setting, feature, priority, and time).

Except for different Setting types (e.g., different sets of enumerated actuator setting types) and different Feature types (e.g., different sets of enumerated feature types) appropriate to different actuators, the operation of the feature coordinator 124 of FIGS. 1 and 2 may be highly similar or identical for different types of ubiquitous computing devices 100. The example feature controllers 106-112 perform a toCoord!setting,mode action that transmits the actuator setting and mode setting in a record with the correct feature, priority, and time, and writing the record to a toCoord data stream. The toCoord data stream provides the feature records 116-122 from all of the feature controllers 106-112 to the feature coordinator 124, which processes the feature records 116-122 to add and/or remove feature records 116-122 from the feature record cache 114. In this example, it is assumed that records of the toCoord stream are ordered by time (although adjacent records can have the same time). The example feature record feature record manager 202 processes the feature records 116-122 in the order they are received at the feature coordinator 124.

The example feature record cache 114 may be considered a state of the feature coordinator 124. The example feature record manager 202 initializes the feature record cache 114 to an empty list. As the feature record manager 202 processes records received in the toCoord stream, the feature record manager 202 controls the state of the feature record cache 114 by adding and/or removing feature records 116-122. Thus, the example feature record cache 114 contains the current actuator setting of all of the feature/priority pairs generated by the example feature controllers 106-112, where dontCare cause feature records 116-122 to be removed. In the example of FIG. 2, the feature record manager 202 also orders the feature records 116-122 in the feature record cache 114 by priority (e.g., highest priority to lowest priority or vice versa).

In the example of FIG. 2, the feature record cache 114 has the following properties: 1) no record in the list has dontCare as its actuator setting. (e.g., feature records 116-122 having dontCare actuator settings are not stored explicitly in the feature record cache 114); 2) for each feature/priority pair, there is at most one record with that combination of feature and priority (e.g., the current actuator setting corresponding to that feature); 3) the records are ordered by priority, with the highest priority first (e.g., adjacent records can have the same priority because priority values are not unique); and 4) within a group of feature records having the same priority, the feature records are ordered by time, with the highest time (e.g., the most recent record) first (e.g., adjacent records can have the same time because times are not unique).

Second, there is a variable oldSet:Setting. The value of oldSet:Setting is the last actuator setting sent by the actuator signal generator 214 to the actuator 102. This excludes its initial value dontCare, which is not sent to the actuator 102.

The example feature record manager 202 processes each input feature record 116-122 in the toCoord data stream by determining whether the input feature record 116-122 matches a feature record stored in the feature record cache 114. The input feature record 116-122 matches a stored record in feature record cache 114 when input feature record 116-122 and the stored record have the same feature and priority.

When the input feature record 116-122 does not match any stored records and the actuator setting of the input feature record 116-122 has an actuator setting of dontCare, the example feature record manager 202 discards the input feature record 116-122. When the input feature record 116-122 does not match any stored records and the actuator setting of the input feature record 116-122 has an enumerated actuator setting (e.g., is not dontCare), the feature record manager 202 inserts the input feature record 116-122 into the feature record cache 114 in the order according to the priority and time of the input feature record 116-122.

When the feature record manager 202 identifies a feature record 116-122 in the feature record cache 114 that matches the input feature record 116-122 and the actuator setting of the input feature record 116-122 is dontCare, the example feature record manager 202 deletes the matching feature record 116-122 from the feature record cache 114 (and does not replace it). As a result, the feature controller 106-112 that generated the input feature record 116-122 no longer has a feature record in the feature record cache 114. When the feature record manager 202 identifies a feature record 116-122 in the feature record cache 114 that matches the input feature record 116-122 and the actuator setting of the input feature record 116-122 is an enumerated actuator setting (e.g., is not dontCare), the feature record manager 202 deletes the matching feature record 116-122 and inserts the input feature record 116-122 into the feature record cache 114 in the order according to the priority and time of the input feature record 116-122.

In some examples, the data stream(s) toCoord that provide feature records 116-122 from the feature controllers 106-112 to the feature coordinator 124 are not necessarily delivered in timestamp order. When data stream(s) cannot be relied upon to deliver feature records in timestamp order, the example feature coordinator 124 adds a further requirement for deleting and/or replacing stored feature records in the feature record cache 114 based on input feature records 116-122. That is, when the feature record manager 202 identifies a feature record 116-122 in the feature record cache 114 that matches the input feature record 116-122, the example feature record manager 202 deletes or replaces the matching feature record 116-122 from the feature record cache 114 only when the timestamp of the input feature record 116-122 is more recent (e.g., has a later time) than the timestamp of the matching feature record 116-122. If the input feature record 116-122 has an earlier timestamp than the matching feature record 116-122, the input feature record 116-122 is obsolete and is discarded.

The example feature record selector 204 of FIG. 2 selects the first-ordered feature record from the feature record cache 114 (e.g., the feature record 116-122 having the highest priority, the feature record 116-122 having the most recent time when multiple feature records have a highest priority).

When the feature record selector 204 selects a first feature record (e.g., the feature record 116 of FIG. 1), the example feature record pruner 206 of FIG. 2 removes any feature records in the feature record cache 114 that have an immediate mode setting and are preempted by the selected feature record.

The example actuator output determiner 208 of FIG. 2 determines an actuator setting to be output to the actuator 102 based on the selected feature record. For example, the actuator output determiner 208 may determine the actuator setting stored in the selected feature record 116 and store the actuator setting in a temporary variable newSet:setting. In some examples, the feature record pruner 206 only removes feature records that have an immediate mode setting and an actuator setting that is not equal to the newSet:setting variable.

The example actuator output comparator 210 of FIG. 2 compare a current setting of the output device to the first output setting determines whether an output signal is necessary by comparing a most recent actuator setting applied to the actuator 102 (e.g., oldSet:setting) that is stored in the actuator output cache 212. When the actuator output comparator 210 determines that newSet:setting is equal to oldSet:setting, a new signal to the actuator 102 is not needed. In contrast, when the actuator output comparator 210 determines that newSet:setting is not equal to oldSet:setting, the example actuator output comparator 210 instructs the actuator signal generator 214 to generate a signal to implement newSet:setting at the actuator 102.

The example actuator signal generator 214 generates a signal based on the type of the actuator 102 and the actuator setting to be implemented. When the actuator signal generator 214 outputs the signal to the actuator 102, the example actuator signal generator 214 also updates the oldSet:setting variable in the actuator output cache 212.

The operation of the example feature coordinator 124 of FIGS. 1 and/or 2 may be restated as: a feature's current setting (excluding dontCare) at a priority p and with a timestamp t is in force unless another feature record 116-122 (e.g., an output from another feature controller 106-112) has a different actuator setting at a priority greater than p, another feature record 116-122 (e.g., an output from another feature controller 106-112) has a different current setting at priority p, and with time t or more recent than t, or the actuator setting has an immediate mode setting, and since time t a different actuator setting has been applied.

Using the example features described above (e.g., EO, ID, HFE, and NL), the behavior of the feature coordinator 124 is consistent with the priorities of the features. For example, the actuator setting (e.g., lock or unlock) of the feature controller 106 for EO is in force, when EO does not have a dontCare actuator setting. The actuator setting (e.g., lock) of the feature controller 108 for ID is in force unless EO has an unlock setting in force (e.g., due to the higher priority of feature records associated with EO). The actuator setting (e.g., unlock) of the feature controller 110 for HFE is in force unless, since the last comingHome event triggering the feature controller 110 to set an unlock actuator setting, EO or ID has had a lock setting in force. The actuator setting (e.g., lock) of the feature controller 112 for NL is in force unless EO and/or HFE have an unlock setting in force. If none of the feature controllers 106-112 have a current lock or unlock actuator setting, then the most recent actuator setting in force continues to stay in force.

In some examples, feature controllers can be added (e.g., by a user) to provide guaranteed behaviors. For example, because the feature controllers 106-112 are independent and the feature coordinator 124 manages the interactions between the feature controllers 106-112, a guaranteed behavior can be added as another independent feature controller that sets feature records having a high priority (e.g., the highest priority). Adding a feature controller need not affect other feature controllers, and may not necessarily even require the user to understand the operations of the other feature controllers.

Figure 3:
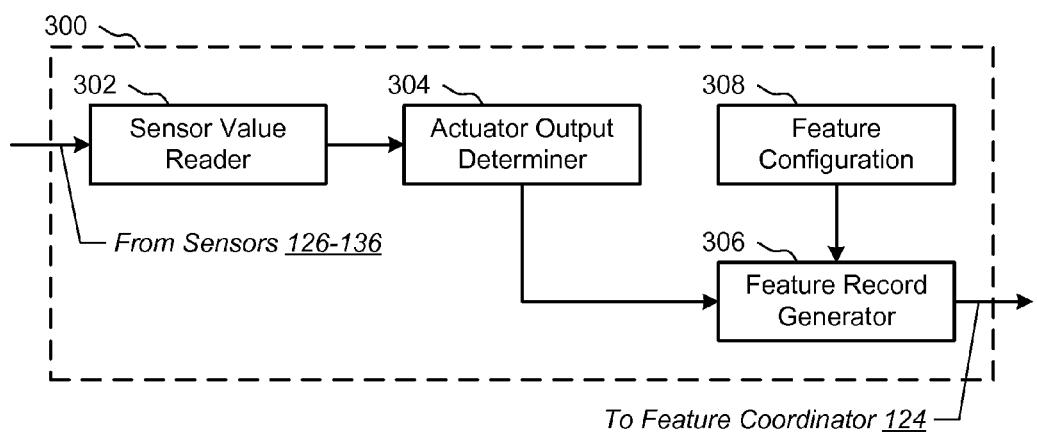
FIG. 3 is a block diagram of an example implementation of a feature controller to implement the feature controllers of FIG. 1.

FIG. 3 is a block diagram of an example implementation of a feature controller 300 that may be used to implement any of the feature controllers 106-112 of FIG. 1. The example feature controller 300 of FIG. 3 includes a sensor value reader 302, an actuator output determiner 304, a feature record generator 306, and a feature configuration 308.

The example sensor value reader 302 of FIG. 3 receives sensor values as inputs. For example, the sensor value reader 302 may receive physical sensor values (e.g., signals, data streams, etc.) from the example sensors 126, 128, virtual sensor values from the virtual sensor models 130-134, and/or a controlled object status from the object state sensor(s) 136 of FIG. 1.

The example actuator output determiner 304 determines an actuator setting (e.g., actuator settings from an enumerated list or dontCare) based on the received sensor values. The actuator output determiner 304 for the example feature controller 300 is specific to the behavioral requirement that is implemented by the feature controller 300. Examples of state diagrams that may be used to implement actuator output determiners 304 for the door lock example (e.g., NL, HFE, ID, EO) are described below with reference to FIGS. 4A-4D.

In some examples, the actuator output determiner 304 performs a determination of an appropriate actuator setting each time a feature record 116-122 is received. In other examples, the actuator output determiner 304 performs the determination at regular and/or irregular intervals using the most recent sensor values received at the sensor value reader 302.

The example feature record generator 306 generates a feature record (e.g., the feature records 116-122 of FIG. 1) using the actuator setting determined by the actuator output determiner 304. The feature record generator 306 further includes a mode setting (e.g., immediate or eventual), a priority value, a timestamp time, and the feature type. The example feature configuration 308 stores the mode setting (e.g., immediate or eventual), the priority value, and/or the feature type that is assigned to the example feature controller 300.

While example manners of implementing feature controllers 106-112 and the feature coordinator of FIG. 1 are illustrated in FIGS. 2 and 3, one or more of the elements, processes and/or devices illustrated in FIGS. 1, 2, and/or 3 may be combined, divided, re-arranged, omitted, eliminated and/or implemented in any other way. Further, the example actuator 102, the example feature controllers 106-112, the example feature record cache 114, the example feature coordinator 124, the example sensors 126, 128, the example virtual sensor models 130-134, the example object state sensor 136, the example feature record manager 202, the example feature record selector 204, the example feature record pruner 206, the example actuator output determiner 208, the example actuator output comparator 210, the example actuator output cache 212, the example actuator signal generator 214, the example sensor value reader 302, the example actuator output determiner 304, the example feature record generator 306, the example feature configuration 308 and/or, more generally, the example ubiquitous computing device 100 of FIG. 1 may be implemented by hardware, software, firmware and/or any combination of hardware, software and/or firmware. Thus, for example, any of the example actuator 102, the example feature controllers 106-112, the example feature record cache 114, the example feature coordinator 124, the example sensors 126, 128, the example virtual sensor models 130-134, the example object state sensor 136, the example feature record manager 202, the example feature record selector 204, the example feature record pruner 206, the example actuator output determiner 208, the example actuator output comparator 210, the example actuator output cache 212, the example actuator signal generator 214, the example sensor value reader 302, the example actuator output determiner 304, the example feature record generator 306, the example feature configuration 308 and/or, more generally, the example ubiquitous computing device 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example actuator 102, the example feature controllers 106-112, the example feature record cache 114, the example feature coordinator 124, the example sensors 126, 128, the example virtual sensor models 130-134, the example object state sensor 136, the example feature record manager 202, the example feature record selector 204, the example feature record pruner 206, the example actuator output determiner 208, the example actuator output comparator 210, the example actuator output cache 212, the example actuator signal generator 214, the example sensor value reader 302, the example actuator output determiner 304, the example feature record generator 306, and/or the example feature configuration 308 is/are hereby expressly defined to include a tangible computer readable storage device or storage disk such as a memory, a digital versatile disk (DVD), a compact disk (CD), a Blu-ray disk, etc. storing the software and/or firmware. Further still, the example ubiquitous computing device 100 of FIG. 1 may include one or more elements, processes and/or devices in addition to, or instead of, those illustrated in FIGS. 1, 2, and/or 3, and/or may include more than one of any or all of the illustrated elements, processes and devices.

In the examples of FIGS. 4A-4D, reading a record from a stream uses the notation streamName ? recordType, and writing a record to a stream uses the notation streamName ! record. The guard of a transition is separated from its actions by a slash.

Figure 4A:
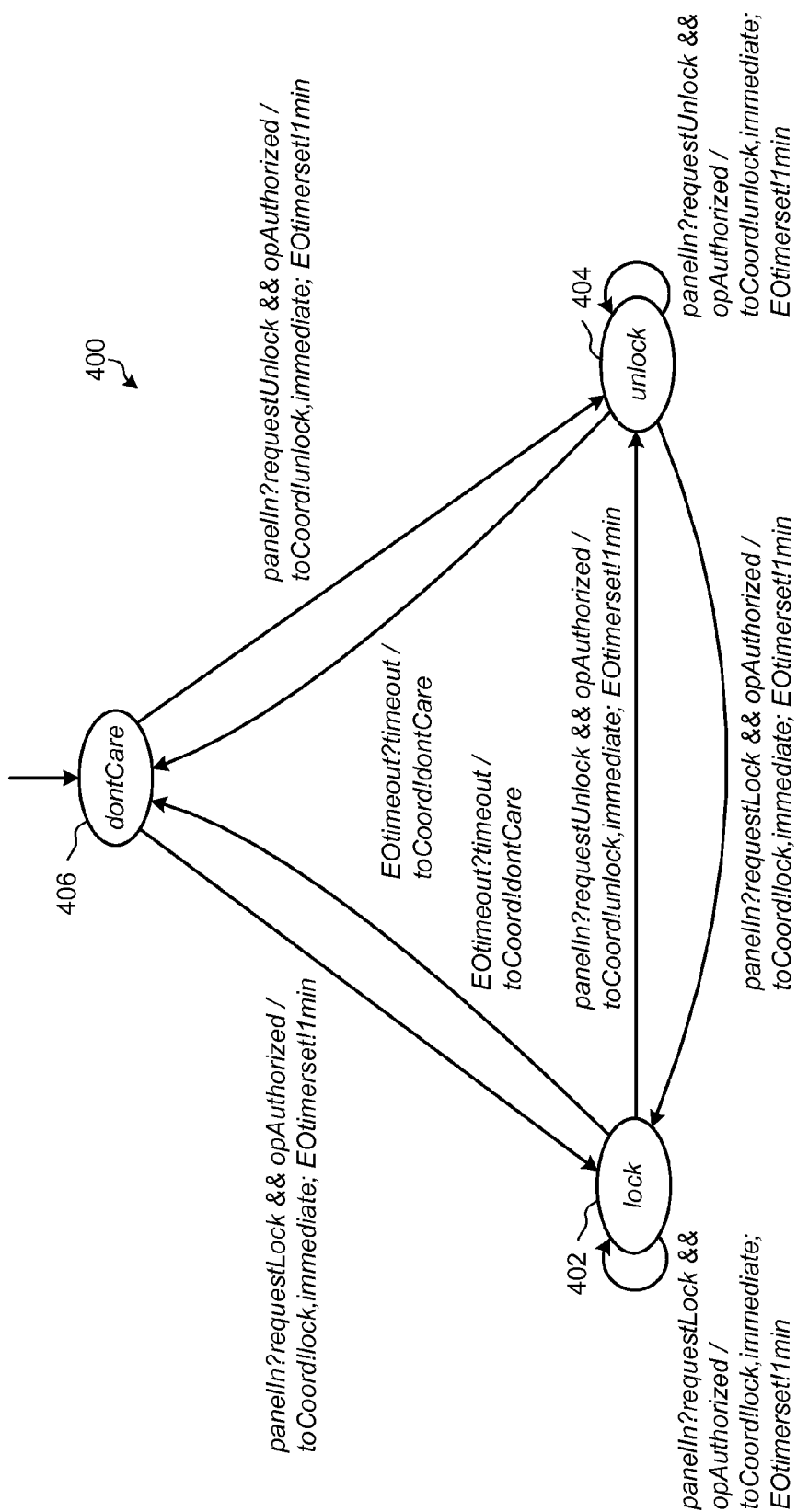

FIG. 4A is an example state diagram 400 that may be implemented by the example actuator output determiner 304 for the example feature controller 106 of FIG. 1 to control the example Electronic Operation feature discussed above for a door lock ubiquitous computing device. In FIG. 4A, the stream names panelIn and panelOut are used generically, because in the door lock example there are two access panels on the door lock, and the lock and/or unlock requests are received from one of the panels at a time.

The example state diagram 400 determines whether the virtual actuator setting output to the feature coordinator 124 is to be lock, unlock, or dontCare based on a panelIn variable, an opAuthorized variable, and an EOtimeout variable (e.g., from a combination of physical sensor(s) 126, 128, virtual sensor model(s) 130-134, and/or the object state sensor(s) 136 of FIG. 1). The panelIn variable indicates whether a user has requested the controlled object 103 of FIG. 1 to be locked or unlocked (e.g., based on an input panel to the ubiquitous computing device 100) and/or whether the user is authorized to perform the operation (e.g., whether a correct authorization code has been entered).

In the example state diagram 400 of FIG. 4A, the possible virtual actuator settings lock, unlock, or dontCare are represented as respective states 402, 404, 406. When the actuator output determiner 304 receives an input (e.g., from the sensor value reader 302 of FIG. 3), the actuator output determiner 304 traverses the state diagram 400 based on the values of the panelIn variable (e.g., requestLock, requestUnlock), the opAuthorized variable (e.g., yes, no), and/or the EOtimeout variable (e.g., timeout, no).

In the example state diagram 400, when the state changes to the lock state 402 (from any of the states 402-406), the example actuator output determiner 304 determines that the feature record to be generated by the feature record generator 306 (e.g., for transmission via the toCoord data stream) is to have a lock actuator setting and an immediate mode setting. When the state changes to the unlock state 404 (from any of the states 402-406), the example actuator output determiner 304 determines that the feature record to be generated by the feature record generator 306 (e.g., for transmission via the toCoord data stream) is to have an unlock actuator setting and an immediate mode setting. When the state changes to the dontCare state 406 (from any of the states 402-406), the example actuator output determiner 304 determines that the feature record to be generated by the feature record generator 306 (e.g., for transmission via the toCoord data stream) is to have a dontCare actuator setting (and the mode setting is irrelevant).

FIG. 4B is an example state diagram 410 that may be implemented by the example actuator output determiner 304 for the example feature controller 108 of FIG. 1 to control the example Hands Free Entry feature discussed above for a door lock ubiquitous computing device. The example state diagram 410 determines whether the virtual actuator setting output to the feature coordinator 124 is to be unlock or dontCare based on a HFEsensors variable and a HFEtimeout variable (e.g., from a combination of physical sensor(s) 126, 128, virtual sensor model(s) 130-134, and/or the object state sensor(s) 136 of FIG. 1). The HFEsensors variable indicates whether a user is approaching the house. The HFEtimeout variable indicates whether an HFE timer has expired.

In the example state diagram 410 of FIG. 4B, the possible virtual actuator settings unlock or dontCare are represented as respective states 412, 414. When the actuator output determiner 304 receives an input (e.g., from the sensor value reader 302 of FIG. 3), the actuator output determiner 304 traverses the state diagram 410 based on the values of the HFEsensors variable (e.g., comingHome, no) and/or the HFEtimeout variable (e.g., timeout, no).

In the example state diagram 410, when the state changes to the unlock state 412 (from the dontCare state 414), the example actuator output determiner 304 determines that the feature record to be generated by the feature record generator 306 (e.g., for transmission via the toCoord data stream) is to have an unlock actuator setting and an immediate mode setting. When the state iterates the unlock state 412, the example actuator output determiner 304 does not output a new feature record (e.g., because the door lock is already unlocked). When the state changes to the dontCare state 414 (from the unlock state 412), the example actuator output determiner 304 determines that the feature record to be generated by the feature record generator 306 (e.g., for transmission via the toCoord data stream) is to have a dontCare actuator setting (and the mode setting is irrelevant).

FIG. 4C is an example state diagram 420 that may be implemented by the example actuator output determiner 304 for the example feature controller 110 of FIG. 1 to control the example Intruder Detection feature discussed above for a door lock ubiquitous computing device. The example state diagram 420 determines whether the virtual actuator setting output to the feature coordinator 124 is to be lock or dontCare based on an IDsensors variable (e.g., from a combination of physical sensor(s) 126, 128, virtual sensor model(s) 130-134, and/or the object state sensor(s) 136 of FIG. 1). The IDsensors variable indicates whether intrusion detection sensors have identified a possible intruder near the house.

In the example state diagram 420 of FIG. 4C, the possible virtual actuator settings lock or dontCare are represented as respective states 422, 424. When the actuator output determiner 304 receives an input (e.g., from the sensor value reader 302 of FIG. 3), the actuator output determiner 304 traverses the state diagram 420 based on the value of the IDsensors variable (e.g., intruderDetected, allClear).

In the example state diagram 420, when the state changes to the lock state 422 (from the dontCare state 424), the example actuator output determiner 304 determines that the feature record to be generated by the feature record generator 306 (e.g., for transmission via the toCoord data stream) is to have a lock actuator setting and an eventual mode setting. When the state changes to the dontCare state 424 (from the lock state 422), the example actuator output determiner 304 determines that the feature record to be generated by the feature record generator 306 (e.g., for transmission via the toCoord data stream) is to have a dontCare actuator setting (and the mode setting is irrelevant).

FIG. 4D is an example state diagram 430 that may be implemented by the example actuator output determiner 304 for the example feature controller 112 of FIG. 1 to control the example Night Lock feature discussed above for a door lock ubiquitous computing device. The example state diagram 430 determines whether the virtual actuator setting output to the feature coordinator 124 is to be lock or dontCare based on an NLtimer variable (e.g., from a virtual sensor model 130-134 of FIG. 1 such as a timer or clock). The NLsensors variable indicates whether night mode is active (e.g., whether a current time is within a designated night time range).

In the example state diagram 430 of FIG. 4D, the possible virtual actuator settings lock or dontCare are represented as respective states 432, 434. When the actuator output determiner 304 receives an input (e.g., from the sensor value reader 302 of FIG. 3), the actuator output determiner 304 traverses the state diagram 430 based on the value of the NLtimer variable (e.g., nightBegins, nightEnds).

In the example state diagram 430, when the state changes to the lock state 432 (from the dontCare state 434), the example actuator output determiner 304 determines that the feature record to be generated by the feature record generator 306 (e.g., for transmission via the toCoord data stream) is to have a lock actuator setting and an eventual mode setting. When the state changes to the dontCare state 434 (from the lock state 432), the example actuator output determiner 304 determines that the feature record to be generated by the feature record generator 306 (e.g., for transmission via the toCoord data stream) is to have a dontCare actuator setting (and the mode setting is irrelevant).

Figure 5:
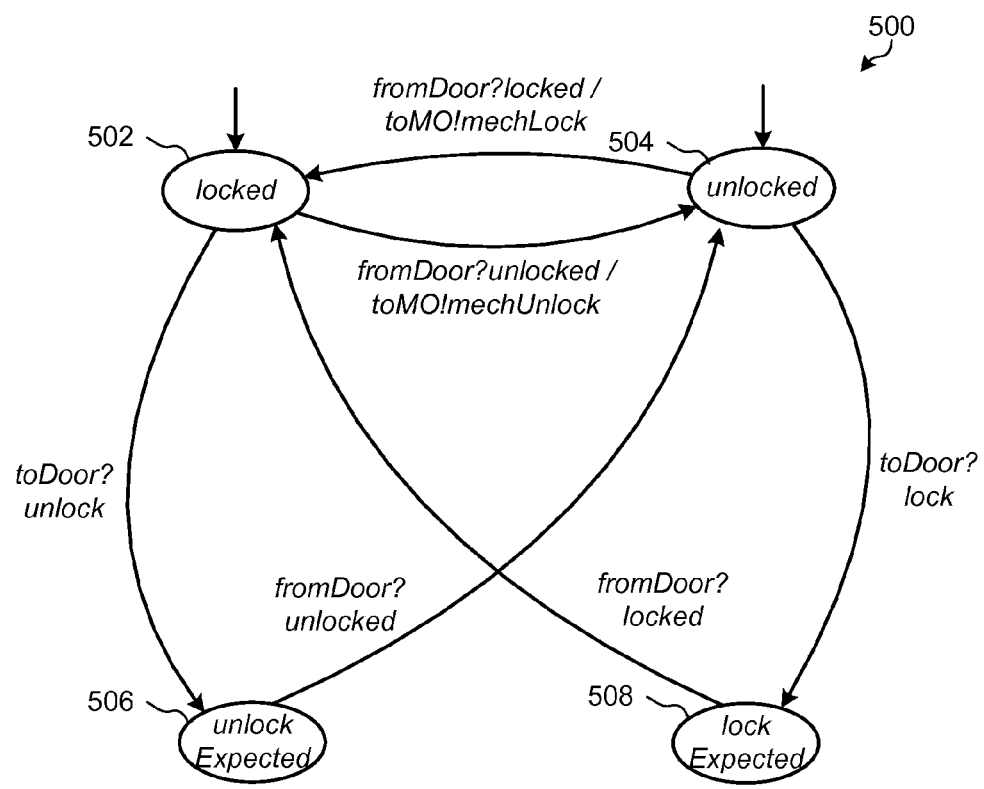
FIG. 5 is an example state diagram that may be used to implement a virtual sensor model of the ubiquitous computing device of FIG. 1.

FIG. 5 is an example state diagram 500 that may be implemented by a virtual sensor model 130-134 of the ubiquitous computing device 100 of FIG. 1. The example state diagram 500 of FIG. 5 represents a detected state of the door lock due to a mechanical lock or unlock operation. The example state diagram 500 includes four states: locked 502, unlocked 504, unlock Expected 506, and lock Expected 508. The virtual sensor model 130-134 implementing the state diagram 500 receives input data streams toDoor (e.g., an actuator output from the feature controller 106-112 implementing the MO feature) and fromDoor (e.g., from the object state sensor 136). The example feature records 116-122 that include the MO feature have the same priority values as the example feature records 116 that include the EO feature.

The example state diagram 500 (e.g., via the virtual sensor model) may initially be in the locked state 502 or the unlocked state 504. When the state diagram 500 detects an input "unlocked" on the data stream fromDoor (e.g., from the object state sensor 136) while in the locked state 502, the example state diagram 500 transitions from the locked state 502 to the unlocked state 504 and the virtual sensor model outputs a mechUnlock virtual sensor value to the toMO data stream (e.g., to the feature controllers 106-112). Conversely, when the state diagram 500 detects an input "locked" on the data stream fromDoor (e.g., from the object state sensor 136) while in the unlocked state 504, the example state diagram 500 transitions from the unlocked state 504 to the locked state 502 and the virtual sensor model outputs a mechLock virtual sensor value to the toMO data stream (e.g., to the feature controllers 106-112).

When the state diagram 500 detects an input "unlock" on the data stream toDoor (e.g., from one of the feature controllers 106-112) while in the locked state 502, the example state diagram 500 transitions from the locked state 502 to the unlock Expected state 506. Then, when the state diagram 500 detects an input "unlocked" on the data stream fromDoor (e.g., from the object state sensor 136) while in the unlock Expected state 506, the example state diagram 500 transitions from the unlock Expected state 506 to the unlocked state 504.

Conversely, when the state diagram 500 detects an input "lock" on the data stream toDoor (e.g., from one of the feature controllers 106-112) while in the unlocked state 504, the example state diagram 500 transitions from the unlocked state 504 to the lock Expected state 508. Then, when the state diagram 500 detects an input "locked" on the data stream fromDoor (e.g., from the object state sensor 136) while in the lock Expected state 508, the example state diagram 500 transitions from the lock Expected state 508 to the locked state 502.

Using the example state diagram 500, the example virtual sensor model 130-134 can infer whether an unlock actuator setting or a lock actuator setting is due to a mechanical operation. This information may be used by the MO feature to achieve quiescence in the ubiquitous computing device 100.

When the feature controller 106-112 implementing the MO feature receives a mechUnlock from the virtual sensor model 130-134 implementing the state diagram 500, the feature controller 106-112 will echo the mechanical operation electronically by sending a feature record 116-122 that includes an unlock actuator setting and an immediate mode setting to the toCoord data stream. The feature coordinator 124 inserts the feature record into the feature record cache 114 and prevent lower-priority locks until the 1-minute duration is over. When the 1-minute duration is over the MO feature controller will send a feature record containing a dontCare actuator setting to the toCoord data stream. The updated record may cause the feature coordinator 124 to, for example, lock the door in accordance with the actuator setting of the NightLock feature controller 112.

Figure 6:
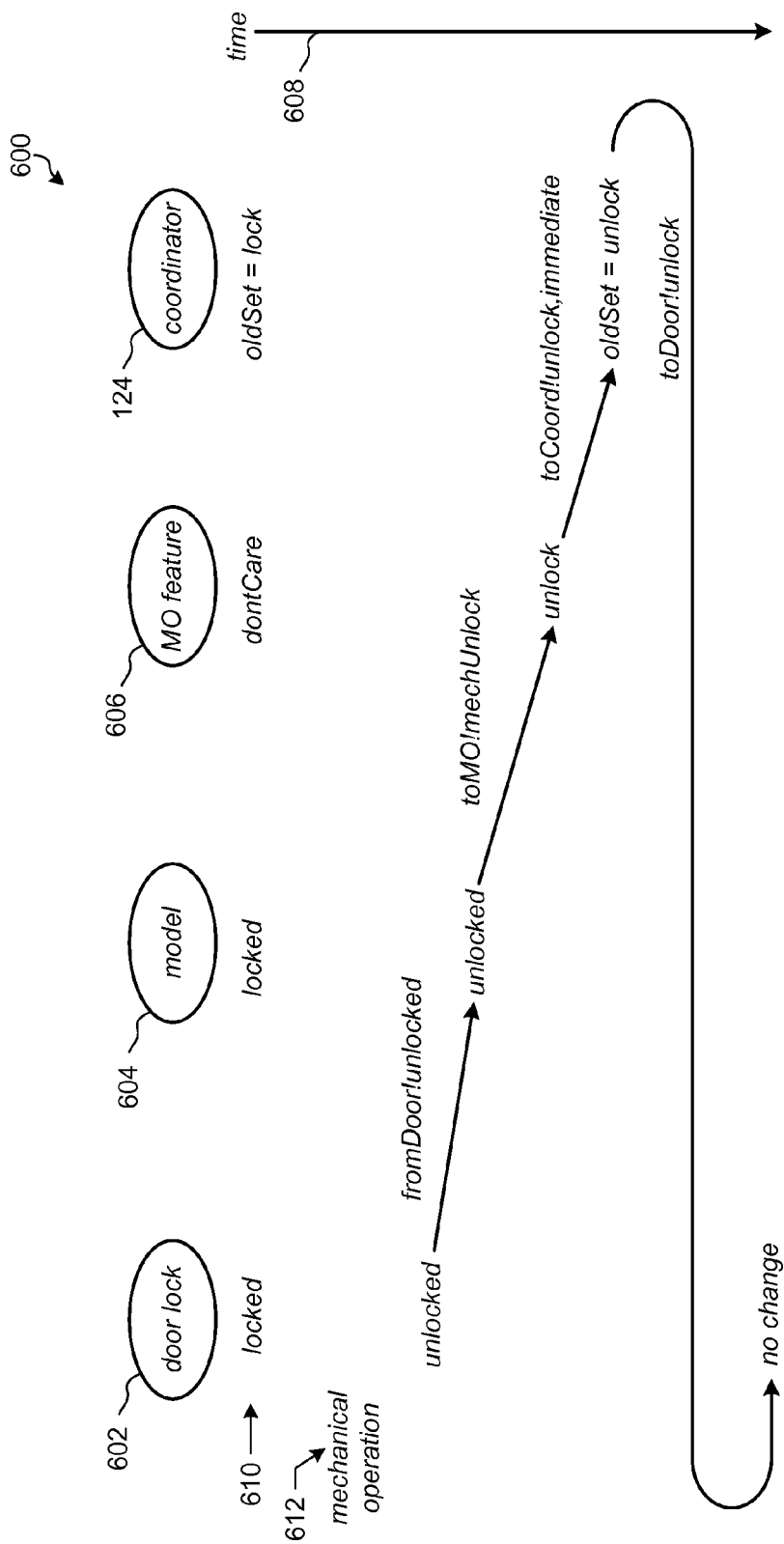
FIG. 6 is a flowchart illustrating an example manner in which the ubiquitous computing device of FIG. 1 may reach quiescence following manual operation of the ubiquitous computing device.

FIG. 6 is a flowchart 600 illustrating an example manner in which the ubiquitous computing device 100 of FIG. 1 may reach quiescence following a mechanical operation of the ubiquitous computing device 100. The example flowchart 600 represents the respective states of a door lock sensor 602 (e.g., the object state sensor 136 of FIG. 1), the virtual sensor model 604 representing the state of the door (e.g., the state diagram 500 of FIG. 5, the virtual sensor model 130-134 of FIG. 1), the MO feature controller 606 (e.g., the feature controller 106-112 implementing the MO feature), and the feature coordinator 124 of FIG. 1. The example flowchart 600 of FIG. 6 also includes a time axis 608 that shows the chronological order of the flowchart 600.

At a first time 610, the door lock sensor 602 is in a locked state, the virtual sensor model 604 is in a locked state, the MO feature 606 has a dontCare actuator setting, and the feature coordinator 124 has an oldSet variable=lock. At a second time 612, a mechanical unlock operation of the controlled object 103 occurs that places the door lock sensor 602 in an unlocked state. The example virtual sensor model 604 receives an input fromDoor (e.g., from the object state sensor 136) with an unlocked value. As described with reference to the state diagram 500 of FIG. 5, the virtual sensor model 604 outputs a mechUnlock virtual sensor value via a toMO data stream to the feature controller 606.

The example feature controller 606 receives the input sensor value. The example actuator output determiner 304 of the feature controller 606 determines the virtual actuator setting of the feature controller 606 to be unlock. The example feature record generator 306 of the feature controller 606 generates a feature record having the unlock actuator setting and an immediate mode setting. The feature controller 606 outputs the feature record to the example feature coordinator 124 via the toCoord data stream. Based on the priority and/or time values of the feature record (as specified in the feature record by the feature controller 606), the example feature coordinator 124 determines the actuator setting to the actuator 102 to be unlock and generates an output signal to the actuator 102. The example feature coordinator 124 then sets the oldSet variable of the feature coordinator 124 to oldSet=unlock.

Because the controlled object 103 is already unlocked and the door lock sensor 602 has detected the unlocked state, the command from the feature coordinator 124 does not cause any change to the controlled object 103 by the actuator 102 or to the state sensed by the door lock sensor 602. Thus, as shown in FIG. 6, the ubiquitous computing device 100 reaches quiescence after external stimuli cause changes to the state of the ubiquitous computing device 100, the actuator 102, and/or the controlled object 103.

In some examples, the feature controllers 106-112 of FIG. 1 receive sensor values (e.g., real sensor values, virtual sensor values) from multiple controlled objects. Additionally or alternatively, the example ubiquitous computing device 100 may include multiple feature coordinators that correspond to multiple actuators. In some such examples, any of the feature controllers 106-112 may send actuator settings to any of the multiple feature coordinators to control the corresponding actuators.

In some examples, the feature coordinator 124 includes one or more timers. In some such examples, feature records further include a duration data item in addition to the five data items discussed above (i.e., actuator setting, mode setting, time, priority, feature). When the feature coordinator 124 receives a feature record, the feature coordinator 124 sets a timer for the duration stored in the feature record. The feature coordinator 124 removes the feature record from the feature record cache 114 if the timer times out the feature record is still in the feature record cache 114 (e.g., has not been preempted or deleted by the feature coordinator 124 based on a more recent feature record).

In some examples, the feature controllers 106-112 are not required to use actuator setting values taken from enumerated sets. For example, when one or more ubiquitous computing devices 100 control light fixtures in a home, the actuator settings may include a contiguous range. In some such examples, when the actuator setting is not dontCare, the actuator setting is a lower bound, an upper bound, or both. In other words, an actuator setting is a subrange of a total range of a light fixture. Such ranges may be stored as actuator settings in the feature record cache. The example feature coordinator 124 may then compute an output actuator setting by attempting to satisfy all of the subranges in the feature records in the feature record cache, and use the priority values of the feature records to resolve any conflicts that may exist between subranges. The feature coordinator 124 may further cancel feature records having an immediate mode setting and actuator setting subranges that are incompatible with the computed range. In some such examples, the feature coordinator 124 only sends a new actuator setting when the oldSet value is outside the newSet computed subrange.

In some examples, the feature coordinator 124 informs the feature controllers 106-112 whether the actuator setting set by that feature is in force or not. For example, feature controllers 106-112 that have alternative ways of achieving the behavioral requirement corresponding to the feature controller 106-112 may use such information from the feature coordinator 124 to invoke alternative ways of achieving their goals when appropriate.

While the examples disclosed herein use data streams, other communication methods between the feature controllers 106-112, the feature coordinator 124, and/or the sensors 126-136 may be used. For example, inputs to the feature controllers 106-112 and/or to the feature coordinator 124 may be synchronized to avoid a race condition that could lead transient and/or fluctuating control of the actuator 102. Additionally or alternatively, the feature controllers 106-112 and/or the feature coordinator 124 may be configured to process data in batches.

Figure 7:
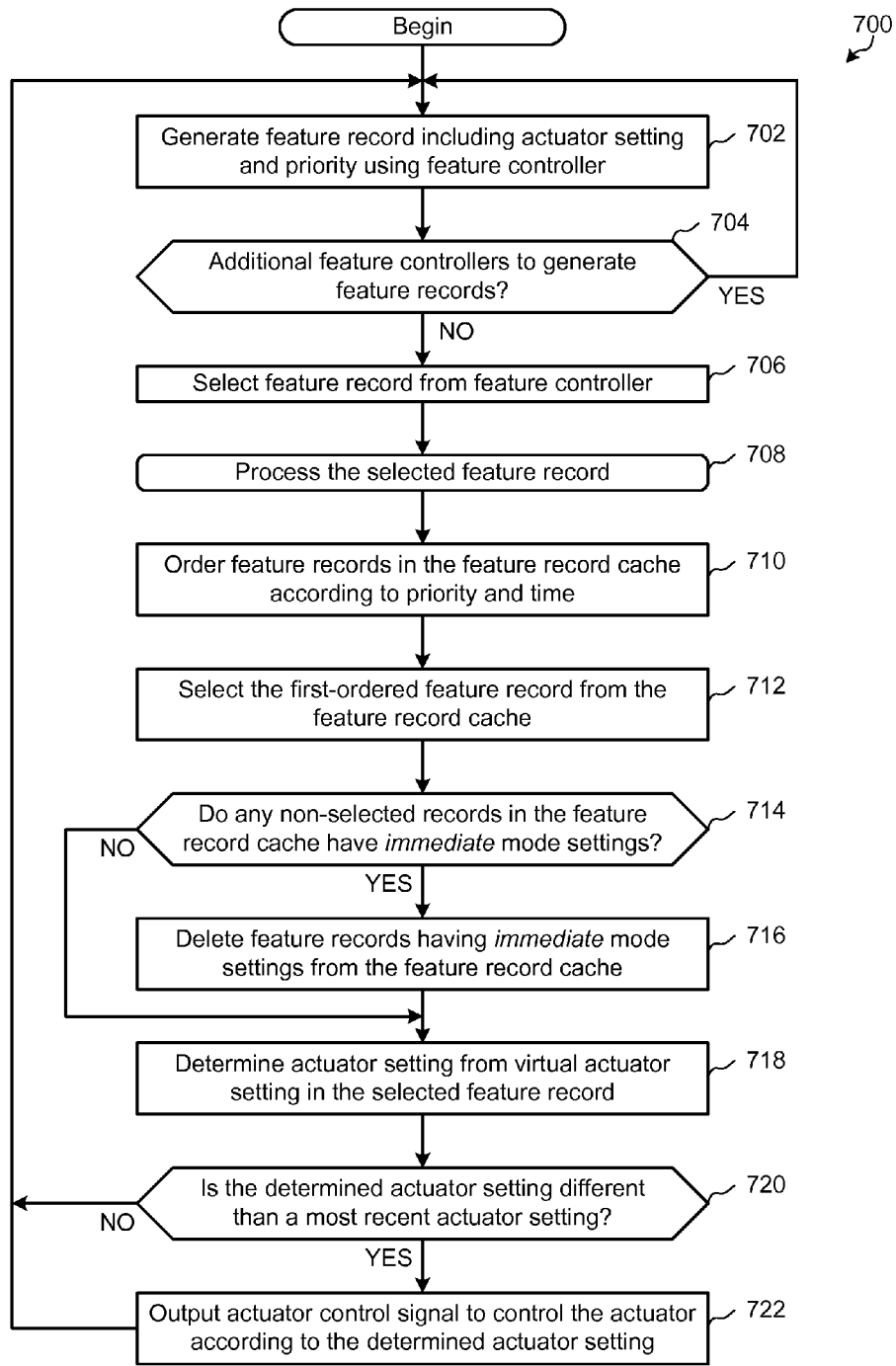
FIG. 7 is a flowchart representative of example machine readable instructions which may be executed by the example ubiquitous computing device of FIG. 1 to control the output of an actuator.
Figure 8:
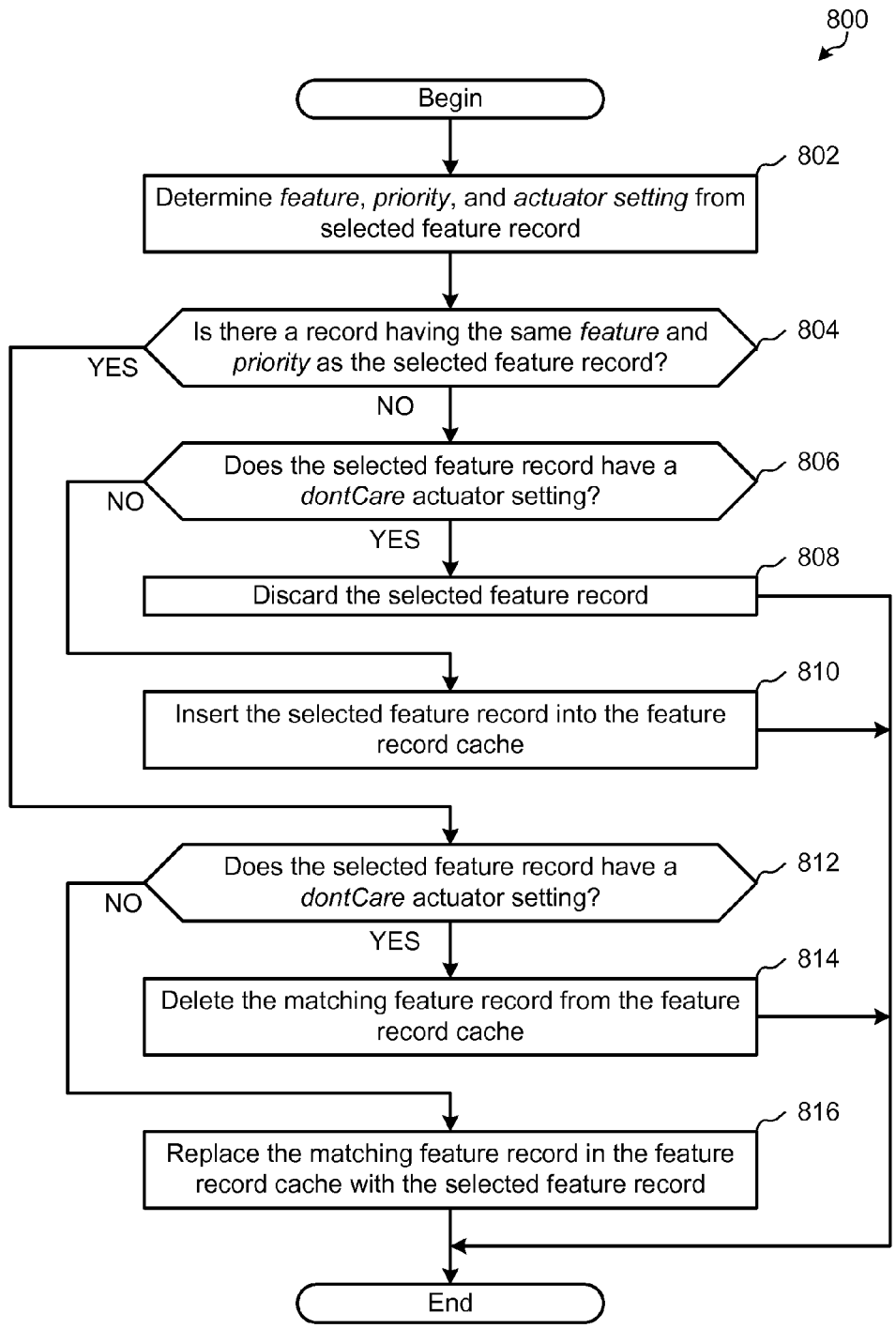
FIG. 8 is a flowchart representative of example machine readable instructions which may be executed by the example feature coordinator of FIGS. 1 and/or 2 to process a feature record.
Figure 9:
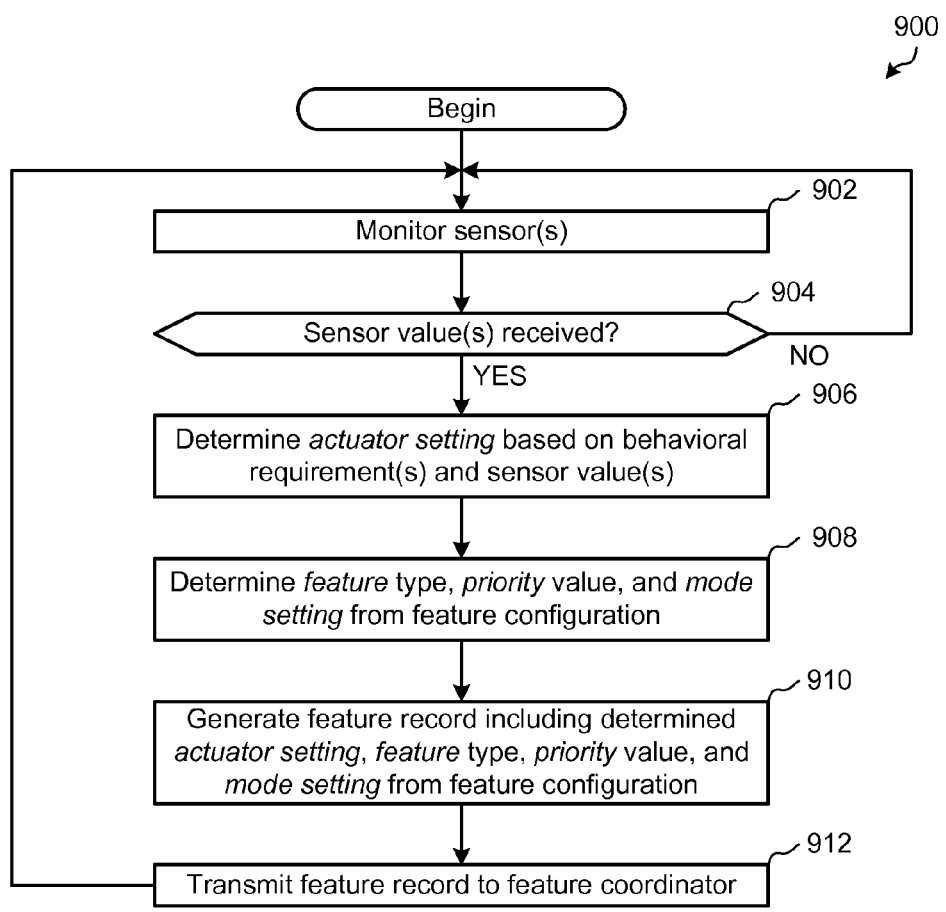
FIG. 9 is a flowchart representative of example machine readable instructions which may be executed by the example feature controllers of FIGS. 1 and/or 3 to generate a feature record.

Flowcharts representative of example machine readable instructions for implementing the feature controllers 106-112, the example feature coordinator 124 and/or, more generally, the ubiquitous computing device 100 of FIGS. 1, 2, and/or 3 are shown in FIGS. 7, 8, and 9. In this example, the machine readable instructions comprise programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the example programs are described with reference to the flowcharts illustrated in FIGS. 7, 8, and 9, many other methods of implementing the example feature controllers 106-112, the example feature coordinator 124 and/or, more generally, the ubiquitous computing device 100 may alternatively be used. For example, the order of execution of the blocks may be changed, and/or some of the blocks described may be changed, eliminated, or combined.

As mentioned above, the example processes of FIGS. 7, 8, and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7, 8, and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 7 is a flowchart representative of example machine readable instructions 700 which may be executed by the example ubiquitous computing device 100 of FIG. 1 to control the output of an actuator 102.

The example ubiquitous computing device 100 of FIG. 1 generates a feature record 116-122 including an actuator setting and a priority value (e.g., using one of the feature controllers 106-112, 300 of FIGS. 1 and/or 3) (block 702). The actuator setting is a virtual actuator setting that the feature controller 106-112 is attempting to enforce at the actuator 102. The priority value represents a relative priority given to the feature controller 106-112 that is based on the relative importance of the behavior being implemented by the feature controller 106-112.

The example ubiquitous computing device 100 of FIG. 1 determines whether additional feature controllers 106-112 are to generate additional feature records 116-122 (block 704). If additional feature controllers 106-112 are generating feature records 116-122 (block 704), control returns to block 702 to generate another feature record 116-122 via another feature controller 106-112.

When no additional feature controllers 106-112 are to generate feature records (block 704) (e.g., all feature controllers 106-112 have been given the opportunity to generate a feature record 116-122, an interrupt has been issued to cause the feature coordinator 124 to process the feature records 116-122, etc.), the example feature record manager 202 of the feature coordinator 124 of FIGS. 1 and/or 2 selects a feature record 116-122 from the feature controllers (block 706). For example, the feature record manager 202 may select a feature record 116-122 from the data stream toCoord discussed above.

The example feature record manager 202 processes the selected feature record 116-122 (block 708). Processing the feature record 116-122 results in inserting, deleting, and/or replacing one or more feature record(s) 116-122 in the feature record cache 114. The example feature record manager 202 orders the feature records 116-122 stored in the feature record cache 114 according to the priority values and the times of the stored feature records 116-122 (block 710). For example, the feature record manager 202 may order the records first by highest-priority to lowest-priority and then by most-recent time to least-recent time.

The example feature record selector 204 of FIG. 2 selects the first-ordered feature record 116-122 from the feature record cache 114 (block 712). For example, the feature record selector 204 may select the feature record 116-122 in the feature record cache 114 having the highest priority value or, if multiple feature records 116-122 have a same highest priority value, the most recent of those feature records 116-122.

The example feature record pruner 206 of FIG. 2 determines whether any non-selected records in the feature record cache 114 have immediate mode settings (block 714). If any non-selected records in the feature record cache 114 have immediate mode settings (block 714), the example feature record pruner 206 deletes those non-selected records in the feature record cache 114 that have immediate mode settings (block 716).

After deleting the feature records 116-122 that have immediate mode settings (block 716), or if none of the non-selected records in the feature record cache 114 have immediate mode settings (block 714), the example actuator output determiner 208 of FIG. 2 determines an actuator setting from the virtual actuator setting in the selected feature record 116-122 (block 718). The example actuator output comparator 210 determines whether the determined actuator setting is different than a most recent actuator setting (block 720).

If the determined actuator setting is different than a most recent actuator setting (e.g., stored in the actuator output cache 212 of FIG. 2) (block 720), the example actuator signal generator 214 outputs the actuator control signal to control the actuator 102 according to the determined actuator setting (block 722). In the door lock example discussed above, if the virtual actuator setting is lock, the example actuator signal generator 214 outputs a signal to cause the actuator 102 to physically lock the door.

After outputting the actuator control signal (block 722), or if the determined actuator setting is the same as a most recent actuator setting (block 720), control returns to block 702 to generate additional feature records 116-122 to continue control of the ubiquitous computing device 100.

In some examples, blocks 702 and 704 are implemented in parallel with blocks 706-722 such that the feature controllers 106-112 generate feature records in parallel with the processing and coordination of the feature records and virtual actuator settings by the feature coordinator 124.

FIG. 8 is a flowchart representative of example machine readable instructions 800 which may be executed by the example feature coordinator 124 of FIGS. 1 and/or 2 to process a feature record. The example instructions 800 of FIG. 8 may be executed to implement the example block 708 of FIG. 7. The instructions 800 are executed when the feature record manager 202 selects a feature record from a feature controller.

The example feature record manager 202 determines a feature, a priority value, and an actuator setting from the selected feature record 116-122 (block 802). The feature and the priority value may be used to match the selected feature record 116-122 to a feature record 116-122 stored in the feature record cache 114.

The feature record manager 202 determines whether the selected feature record 116-122 has the same feature and priority as a stored feature record 116-122 in the feature record cache 114 (block 804). In other words, the feature record manager 202 determines whether the selected feature record 116-122 matches a feature record 116-122 stored in the feature record cache 114. Whether or not the selected feature record 116-122 has the same feature and priority as a stored feature record 116-122 in the feature record cache 114 (block 804), the example feature record manager 202 determines whether the actuator setting of the selected feature record 116-122 is dontCare (block 806 or block 812).

When the input feature record 116-122 does not match any stored records (block 804) and the actuator setting of the input feature record 116-122 is dontCare (block 806), the example feature record manager 202 discards the input feature record 116-122 (block 808). When the input feature record 116-122 does not match any stored records (block 806) and the actuator setting of the input feature record 116-122 is an enumerated actuator setting (e.g., is not dontCare), the feature record manager 202 inserts the input feature record 116-122 into the feature record cache 114 in the order according to its priority and time (block 810).

When the feature record manager 202 identifies a feature record 116-122 in the feature record cache 114 that matches the input feature record 116-122 (block 804) and the input setting is dontCare (block 812), the example feature record manager 202 deletes the matching feature record 116-122 from the feature record cache 114 (and does not replace it) (block 814). As a result, the feature controller 106-112 that generated the input feature record 116-122 no longer has a feature record in the feature record cache 114. When the feature record manager 202 identifies a feature record 116-122 in the feature record cache 114 that matches the input feature record 116-122 (block 804) and the input setting is an enumerated actuator setting (e.g., is not dontCare) (block 814), the feature record manager 202 deletes the matching feature record 116-122 and inserts the input feature record 116-122 into the feature record cache 114 in the order according to its priority and time (block 816).

After processing the selected feature record (block 808, 810, 814, 816), the example instructions 800 end and return control to block 710 of FIG. 7.

FIG. 9 is a flowchart representative of example machine readable instructions 900 which may be executed by the example feature controllers 106-112, 300 of FIGS. 1 and/or 3 to generate a feature record 116-122. The example instructions 900 will be described below with reference to the example feature controller 300 of FIG. 3.

The example sensor value reader 302 of FIG. 3 monitors sensors (block 902). For example, the sensor value reader 302 determines whether sensor values have been received (e.g., via sensor data streams) from the physical sensors 126, 128, the virtual sensor models 130-134, and/or the object state sensor 136. If no sensor values have been received (block 904), control returns to block 902 to continue monitoring the sensor(s) 126-136.

When a sensor value is received (block 904), the example actuator output determiner 304 determines an actuator setting (e.g., a virtual actuator setting) based on the behavioral requirement(s) of the feature controller 300 and the sensor values (block 906). For example, the actuator output determiner 304 may use a state diagram such as the state diagrams 400, 410, 420, 430 of FIGS. 4A-4D to determine the appropriate actuator setting.

The example feature record generator 306 of FIG. 3 determines a feature type, a priority value, and a mode setting from a feature configuration (block 908). For example, the feature record generator 306 retrieves the feature type, the priority value, and the mode setting from the example feature configuration 308 of FIG. 3. The example feature record generator 306 generates a feature record 116-122 including the determined actuator setting, the feature type, the priority value, and the mode setting (block 910). In some examples, the generated feature record 116-122 further includes a time representative of the time the feature record generator 306 generates the feature record 116-122.

The example feature record generator 306 transmits the generated feature record 116-122 to the feature coordinator 124 (block 912). For example, the feature record generator 306 may transmit the generated feature record 116-122 via the toCoord data stream discussed above, from which the feature coordinator 124 may select and process the feature record 116-122. The example instructions 900 return to block 902 to continue monitoring the sensors 126-136 for further sensor values.

Figure 10:
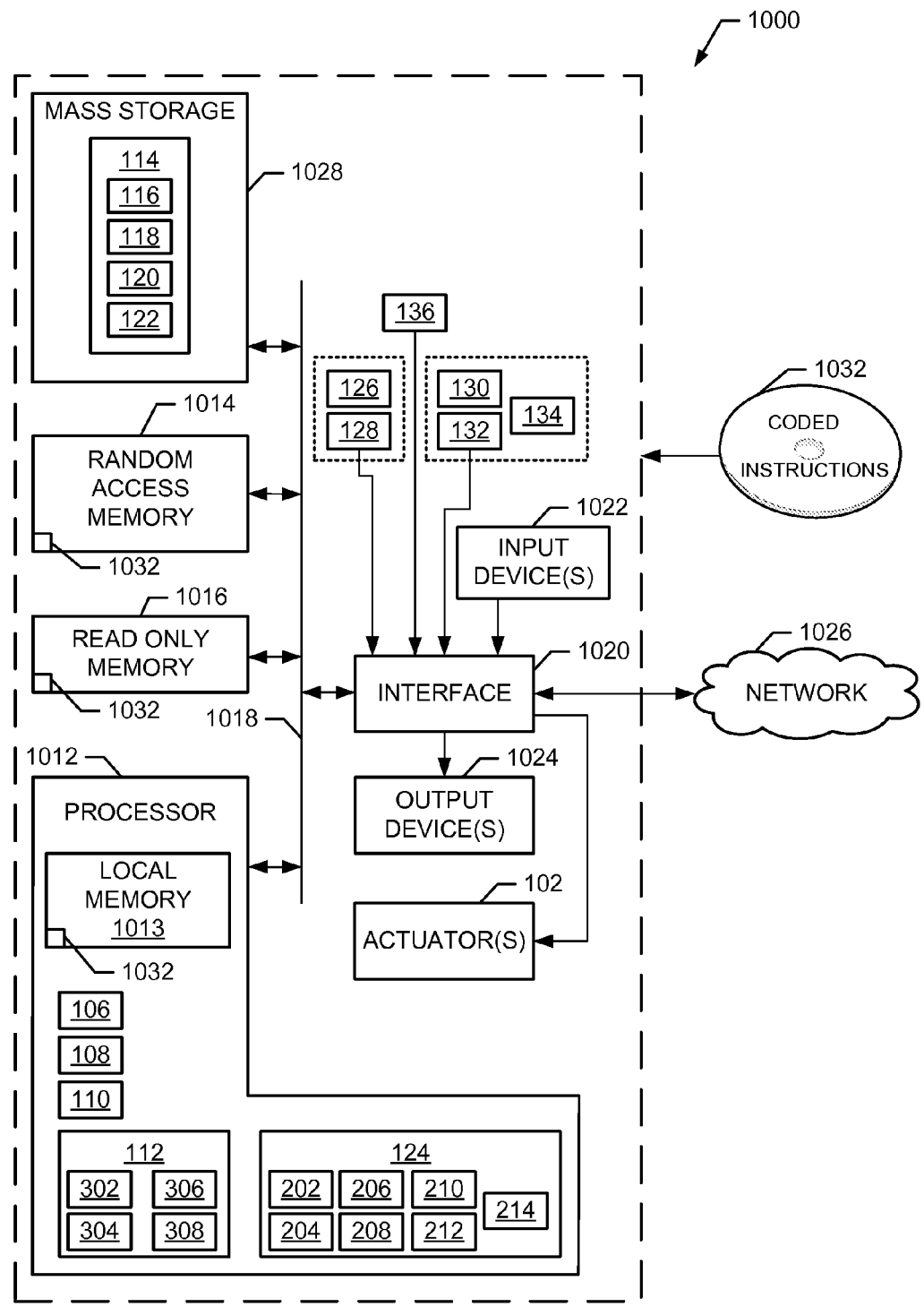
FIG. 10 is a block diagram of an example processor platform capable of executing the instructions of FIGS. 7, 8, and/or 9 to implement the feature controllers, the example feature coordinator and/or, more generally, the ubiquitous computing device of FIGS. 1, 2, and/or 3.

FIG. 10 is a block diagram of an example processor platform 1000 capable of executing the instructions of FIGS. 7, 8, and/or 9 to implement the feature controllers 106-112, the example feature coordinator 124 and/or, more generally, the ubiquitous computing device 100 of FIGS. 1, 2, and/or 3. The processor platform 1000 can be, for example, a server, a personal computer, a routing device, a network node, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The example processor 1012 of FIG. 10 executes the instructions of FIGS. 7, 8, and/or 9 to implement the example feature controllers 106-112, the example feature record cache 114, the example feature coordinator 124, the example sensors 126, 128, the example virtual sensor models 130-134, the example object state sensor 136, the example feature record manager 202, the example feature record selector 204, the example feature record pruner 206, the example actuator output determiner 208, the example actuator output comparator 210, the example actuator output cache 212, the example actuator signal generator 214, the example sensor value reader 302, the example actuator output determiner 304, the example feature record generator 306, and/or the example feature configuration 308 of FIGS. 1, 2, and/or 3.

The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The example sensor(s) 126-136 of FIG. 1 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The example actuator(s) 102 of FIG. 1 are connected to the interface circuit 1020 to receive actuator output signals (e.g., from the processor 1012). The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. The example mass storage device 1028 implements the feature record cache 114 and/or stores the feature records 116-122 of FIG. 1. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 7, 8, and/or 9 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining a first actuator setting to control an actuator based on an input signal;
   setting a first record in a record list, the first record including the first actuator setting, a first immediacy of the first actuator setting, and a first priority of the first actuator setting;
   determining a second actuator setting to control the actuator based on the input signal;
   setting a second record in the record list, the second record including the second actuator setting, a second immediacy of the second actuator setting, and a second priority of the second actuator setting, the second priority being lower than the first priority;
   selecting the first record from the record list based on the first priority being higher than the second priority;
   deleting the second record from the record list based on the second immediacy;
   outputting the first actuator setting to control the actuator when a current setting of the actuator is different than the first actuator setting;
   determining, by executing an instruction with a processor, a third actuator setting to control the actuator based on the input signal;
   setting, by executing an instruction with the processor, a third record in the record list, the third record including the third actuator setting, a third immediacy of the third actuator setting, and a third priority of the third actuator setting, and the third priority being lower than the first and second priorities;
   determining, by executing an instruction with the processor, a fourth actuator setting that is not to affect the actuator;
   setting, by executing an instruction with the processor, a fourth record in the record list, the fourth record including the fourth actuator setting, the first priority, and a same feature identifier as the first record;
   deleting, by executing an instruction with the processor, the first record from the record list based on the fourth actuator setting;
   comparing, by executing an instruction with the processor, the current setting of the actuator to the third actuator setting; and
   outputting, by executing an instruction with the processor, the third actuator setting to control the actuator when the current setting of the actuator is different than the third actuator setting.

2. The method of claim 1, wherein the fourth actuator setting includes an indication that a behavioral requirement of the actuator is indifferent to a state of the actuator.

3. The method of claim 1, wherein the first record further includes a first time, the method further including:
   determining a fourth actuator setting to control the actuator; and
   setting a fourth record in the record list, the fourth record including the fourth actuator setting, a fourth immediacy of the fourth actuator setting, a fourth priority of the fourth actuator setting that is equal to the first priority, and a second time that is prior to the first time, the selecting the first record from the record list being based on the first time being more recent than the second time.

4. The method of claim 1, wherein the first immediacy indicates that the first record is to be maintained until a third record having a same feature identifier as the first record is generated to at least one of replace and delete the first record.

5. The method of claim 1, further including generating the input signal based on at least one of a first sensor signal from a physical sensor and an object state sensor signal from an object state sensor.

6. The method of claim 1, further including:
   storing the first record and the second record in the record list; and
   ordering the first record and the second record in the record list based on the first priority and the second priority, wherein the selecting the first record from the record list is based on the first record being first in an order of records in the record list.

7. An apparatus comprising:
   an actuator to control an output device;
   a processor; and
   a computer readable storage medium including computer readable instructions which, when executed, cause the processor to perform operations including:
     determining a first actuator setting to control the actuator based on an input signal;
     setting a first record in a record list, the first record including the first actuator setting, a first immediacy of the first actuator setting, and a first priority of the first actuator setting;

determining a second actuator setting to control the
actuator based on the input signal;
setting a second record in the record list, the second
record including the second actuator setting, a second immediacy of the second actuator setting, and a
second priority of the second actuator setting, the
second priority being lower than the first priority;
selecting the first record from the record list based on
the first priority being higher than the second priority;
deleting the second record from the record list based on
the second immediacy;
outputting the first actuator setting to control the actuator when a current setting of the actuator is different
than the first actuator setting;
determining a third actuator setting to control the
actuator based on the input signal;
setting a third record in the record list, the third record
including the third actuator setting, a third immediacy of the third actuator setting, and a third priority
of the third actuator setting, and the third priority
being lower than the first and second priorities;
determining a fourth actuator setting that is not to affect
the actuator;
setting a fourth record in the record list, the fourth
record including the fourth actuator setting, the first
priority, and a same feature identifier as the first
record;
deleting the first record from the record list based on the
fourth actuator setting;
comparing the current setting of the actuator to the third
actuator setting; and
outputting the third actuator setting to control the
actuator when the current setting of the actuator is
different than the third actuator setting.

8. The apparatus of claim 7, wherein the fourth actuator setting includes an indication that a behavioral requirement of the actuator is indifferent to a state of the actuator.

9. The apparatus of claim 7, wherein the first record further includes a first time, and the operations further include:
determining a fourth actuator setting to control the actuator; and
setting a fourth record in the record list, the fourth record including the fourth actuator setting, a fourth immediacy of the fourth actuator setting, a fourth priority of the fourth actuator setting that is equal to the first priority, and a second time that is prior to the first time, the selecting the first record from the record list being based on the first time being more recent than the second time.

10. The apparatus of claim 7, wherein the first immediacy indicates that the first record is to be maintained until a third record having a same feature identifier as the first record is generated to at least one of replace and delete the first record.

11. The apparatus of claim 7, wherein the operations further include generating the input signal based on at least one of a first sensor signal from a physical sensor and an object state sensor signal from an object state sensor.

12. The apparatus of claim 7, wherein the operations further include:
storing the first record and the second record in the record list; and
ordering the first record and the second record in the record list based on the first priority and the second priority, wherein the selecting the first record from the record list is based on the first record being first in an order of records in the record list.

13. A tangible computer readable storage medium comprising computer readable instructions which, when executed, cause a processor to perform operations including:
determining a first actuator setting to control the actuator based on an input signal;
setting a first record in a record list, the first record including the first actuator setting, a first immediacy of the first actuator setting, and a first priority of the first actuator setting;
determining a second actuator setting to control the actuator based on the input signal;
setting a second record in the record list, the second record including the second actuator setting, a second immediacy of the second actuator setting, and a second priority of the second actuator setting, the second priority being lower than the first priority;
selecting the first record from the record list based on the first priority being higher than the second priority;
deleting the second record from the record list based on the second immediacy;
outputting the first actuator setting to control the actuator when a current setting of the actuator is different than the first actuator setting;
determining a third actuator setting to control the actuator based on the input signal;
setting a third record in the record list, the third record including the third actuator setting, a third immediacy of the third actuator setting, and a third priority of the third actuator setting, and the third priority being lower than the first and second priorities;
determining a fourth actuator setting that is not to affect the actuator;
setting a fourth record in the record list, the fourth record including the fourth actuator setting, the first priority, and a same feature identifier as the first record;
deleting the first record from the record list based on the fourth actuator setting;
comparing the current setting of the actuator to the third actuator setting; and
outputting the third actuator setting to control the actuator when the current setting of the actuator is different than the third actuator setting.

14. The storage medium of claim 13, wherein the fourth actuator setting includes an indication that a behavioral requirement of the actuator is indifferent to a state of the actuator.

15. The storage medium of claim 13, wherein the first record further includes a first time, the operations further including:
determining a fourth actuator setting to control the actuator; and
setting a fourth record in the record list, the fourth record including the fourth actuator setting, a fourth immediacy of the fourth actuator setting, a fourth priority of the fourth actuator setting that is equal to the first priority, and a second time that is prior to the first time, the selecting the first record from the record list being based on the first time being more recent than the second time.

16. The storage medium of claim 13, wherein the first immediacy indicates that the first record is to be maintained until a third record having a same feature identifier as the first record is generated to at least one of replace and delete the first record.

17. The storage medium of claim 13, wherein the operations further include:
   storing the first record and the second record in the record list; and
   ordering the first record and the second record in the record list based on the first priority and the second priority, wherein the selecting the first record from the record list is based on the first record being first in an order of records in the record list.

* * * * *